United States Patent
Wang et al.

(10) Patent No.: US 12,402,044 B2
(45) Date of Patent: Aug. 26, 2025

(54) NODES IN COMMUNICATION NETWORK AND METHODS THEREOF

(71) Applicant: Samsung Electronics Co., Ltd., Gyeonggi-do (KR)

(72) Inventors: Weiwei Wang, Beijing (CN); Hong Wang, Beijing (CN); Lixiang Xu, Beijing (CN)

(73) Assignee: Samsung Electronics Co., Ltd (KR)

(*) Notice: Subject to any disclaimer, the term of this patent is extended or adjusted under 35 U.S.C. 154(b) by 384 days.

(21) Appl. No.: 17/794,771

(22) PCT Filed: Jan. 22, 2021

(86) PCT No.: PCT/KR2021/000892
§ 371 (c)(1),
(2) Date: Jul. 22, 2022

(87) PCT Pub. No.: WO2021/150051
PCT Pub. Date: Jul. 29, 2021

(65) Prior Publication Data
US 2023/0109817 A1    Apr. 13, 2023

(30) Foreign Application Priority Data

Jan. 22, 2020  (CN) .......................... 202010075348.2
Apr. 26, 2020  (CN) .......................... 202010340296.7
Nov. 2, 2020   (CN) .......................... 202011206163.7

(51) Int. Cl.
*H04W 36/00*    (2009.01)
*H04W 36/08*    (2009.01)

(52) U.S. Cl.
CPC ..... *H04W 36/0064* (2023.05); *H04W 36/087* (2023.05)

(58) Field of Classification Search
CPC .......... H04W 36/0064; H04W 36/087; H04W 36/08; H04W 36/0055; H04W 40/22;
(Continued)

(56) References Cited

U.S. PATENT DOCUMENTS

2014/0211756 A1   7/2014   Bontu et al.
2017/0295546 A1   10/2017  Young et al.
(Continued)

FOREIGN PATENT DOCUMENTS

CN    110166273       8/2019
WO    WO 2019/246446  12/2019
(Continued)

OTHER PUBLICATIONS

Ericsson ("(TP for NR-IAB BL CR for TS 38.473): Downlink Backhaul RLC Channel Mapping Configuration for IAB Nodes", 3GPP TSG-RAN WG Meeting #106, R3-197180, Nov. 18-22, 2019) (Year: 2019).*
(Continued)

*Primary Examiner* — Ji-Hae Yea
(74) *Attorney, Agent, or Firm* — The Farrell Law Firm, P.C.

(57) ABSTRACT

The disclosure provides a node in a communication system and a method thereof. The method comprises: receiving a first configuration message from a second node; and transmitting a first configuration completion message to a third node, where a first request message is transmitted from the second node to the third node and a first response message is transmitted from the third node to the second node before receiving the first configuration message from the second node.

20 Claims, 7 Drawing Sheets

(58) Field of Classification Search
CPC .............. H04W 72/0453; H04W 72/54; H04L 5/0053; H04L 5/003
See application file for complete search history.

(56) References Cited

U.S. PATENT DOCUMENTS

| | | |
|---|---|---|
| 2019/0394084 A1 | 12/2019 | Tsai et al. |
| 2020/0374689 A1 | 11/2020 | Shi et al. |
| 2021/0195675 A1* | 6/2021 | Park .................. H04W 88/14 |
| 2021/0250817 A1 | 8/2021 | Zou et al. |

FOREIGN PATENT DOCUMENTS

| | | | |
|---|---|---|---|
| WO | WO-2019246446 A1 * | 12/2019 | ........ H04W 36/0055 |
| WO | WO 2020/001146 | 1/2020 | |

OTHER PUBLICATIONS

Ericsson ("BL CR to 38.473: Support for IAB", 3GPP TSG-RAN WG3 Meeting #106, R3-197811, Nov. 18-22, 2019) (Year: 2019).*
PCT/ISA/210 Search Report issued on PCT/KR2021/000892, Apr. 27, 2021, pp. 3.
PCT/ISA/237 Written Opinion issued on PCT/KR2021/000892, Apr. 27, 2021, pp. 5.
Huawei, HiSilicon, "Solution for Key Issue #3: Service continuity via UE-to-Network Relay", SA WG2 Meeting #136AH S2-2000492 Incheon, South Korea, Jan. 7, 2020, pp. 9.
Qualcomm Incorporated, "Discussion about Successful HO in MRO", 3GPP TSG-RAN WG2 Meeting #108 R2-1915055 Reno, Nevada, USA, Nov. 8, 2019, pp. 5.
3GPP; TSG RAN; NR; RRC protocol specification (Release 15), Jan. 8, 2020, pp. 534.
Ericsson, "BL CR to 38.473: Support for IAB", R3-197811, 3GPP TSG-RAN WG3 Meeting #106, Nov. 18-22, 2019, 67 pages.
3GPP TR 38.874 V16.0.0, 3rd Generation Partnership Project; Technical Specification Group Radio Access Network; NR; Study on Integrated Access and Backhaul; (Release 16), Dec. 2018, 111 pages.
European Search Report dated Sep. 28, 2023 issued in counterpart application No. 21744830.7-1216, 18 pages.
AT&T, "Route Changes Based on Intra-gNB Handover of IAB Node", R-1812405, 3GPP TSG-RAN WG2 Meeting #103, Aug. 20-24, 2018, 4 pages.
Chun-Kai Wang et al., "Online Join Method for Skewed Data Streams", Journal of Software, 2018, 14 pages.
Chinese Office Action dated Jul. 18, 2024 issued in counterpart application No. 202011206163.7, 16 pages.

* cited by examiner

[Fig. 2]

[Fig. 4]
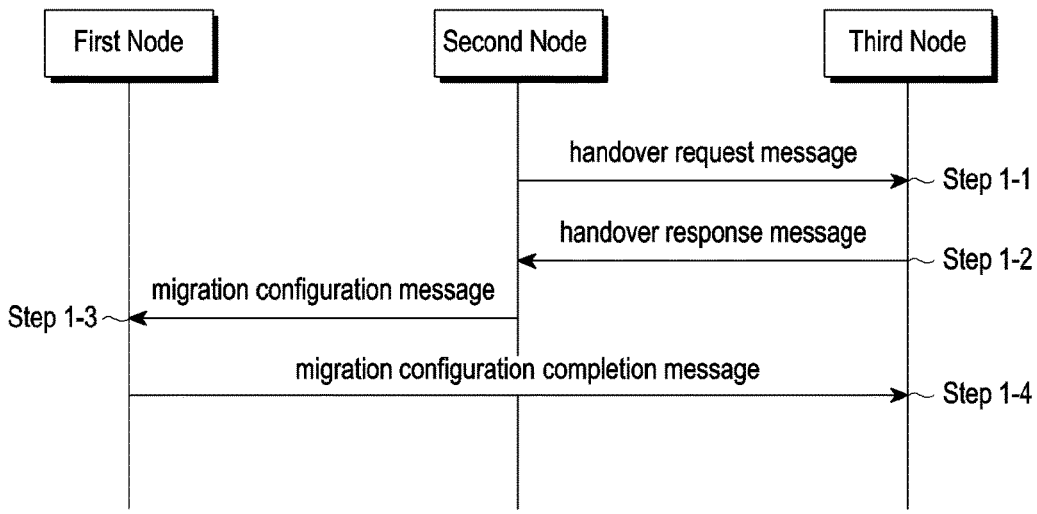
[Fig. 5]
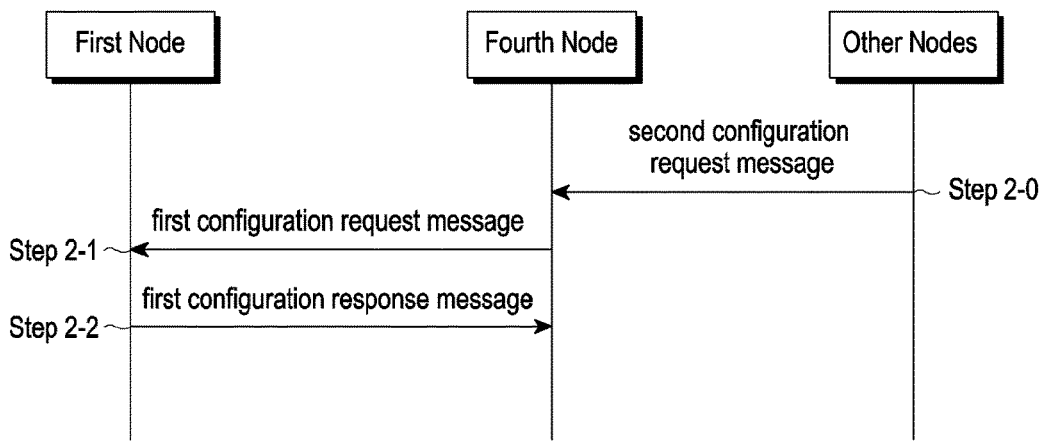
[Fig. 6]
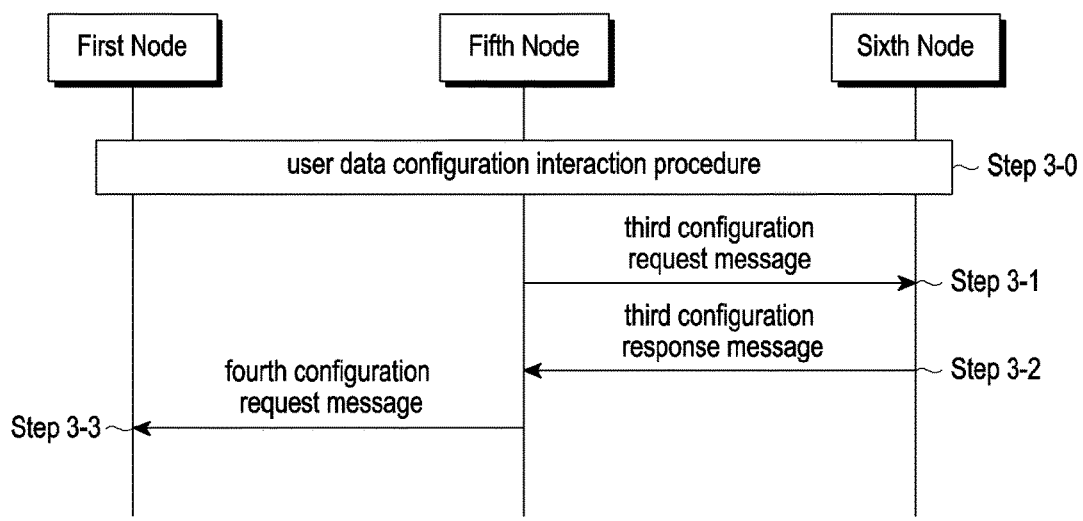

[Fig. 7]
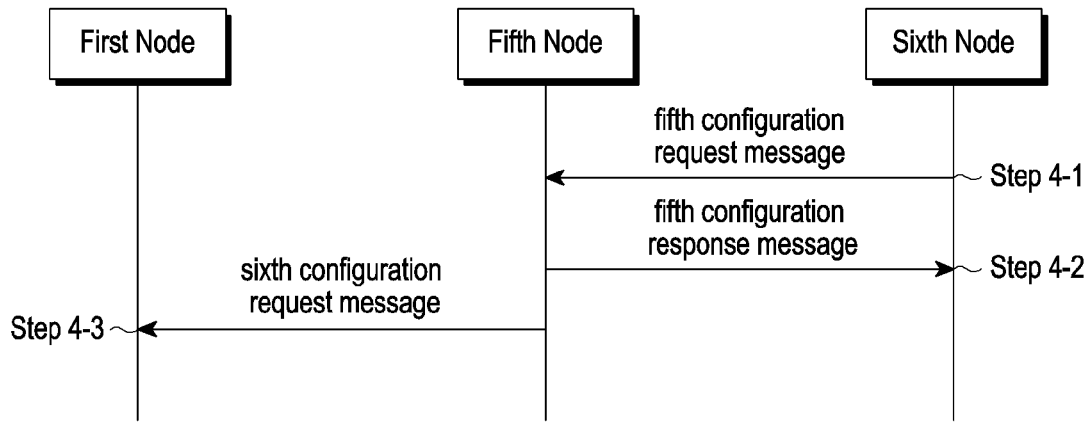
[Fig. 8]
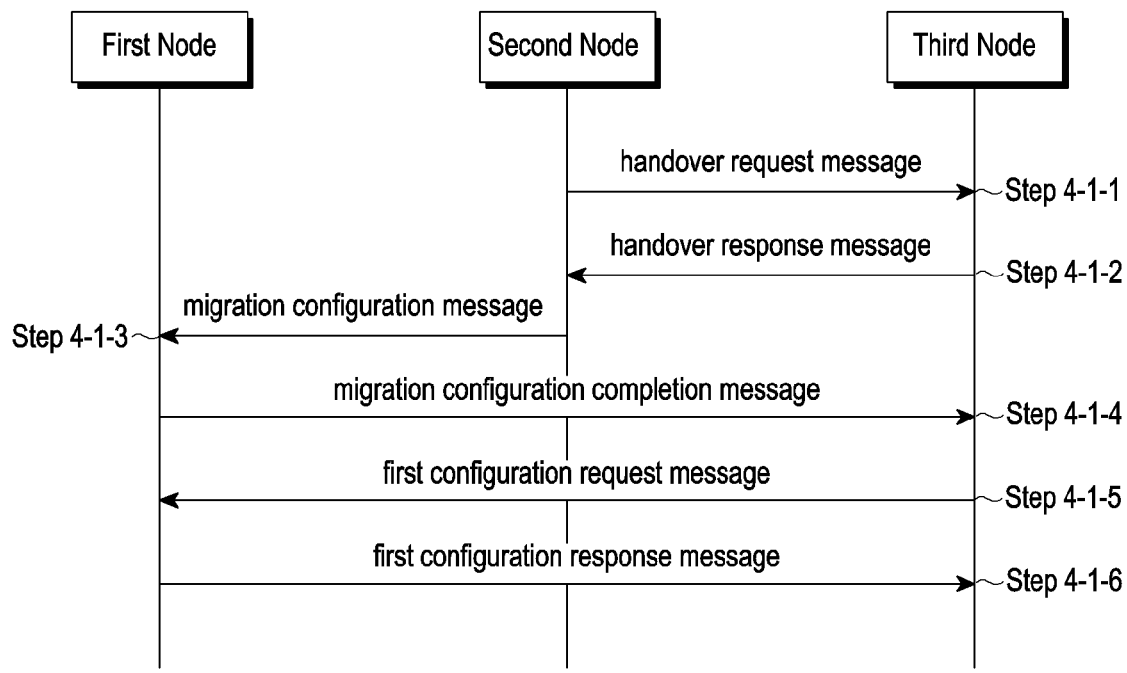

[Fig. 9]
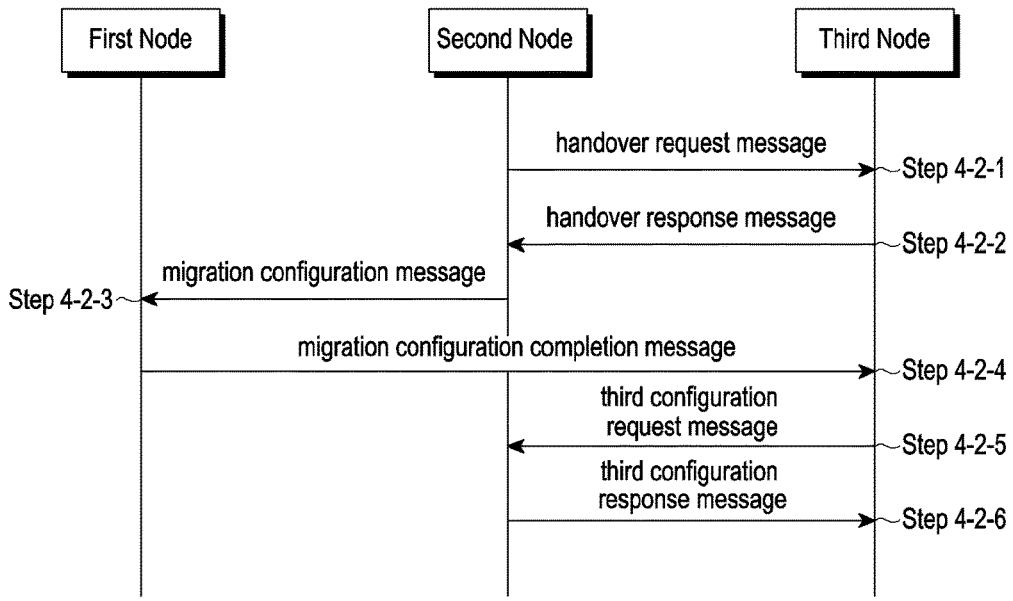
[Fig. 10]
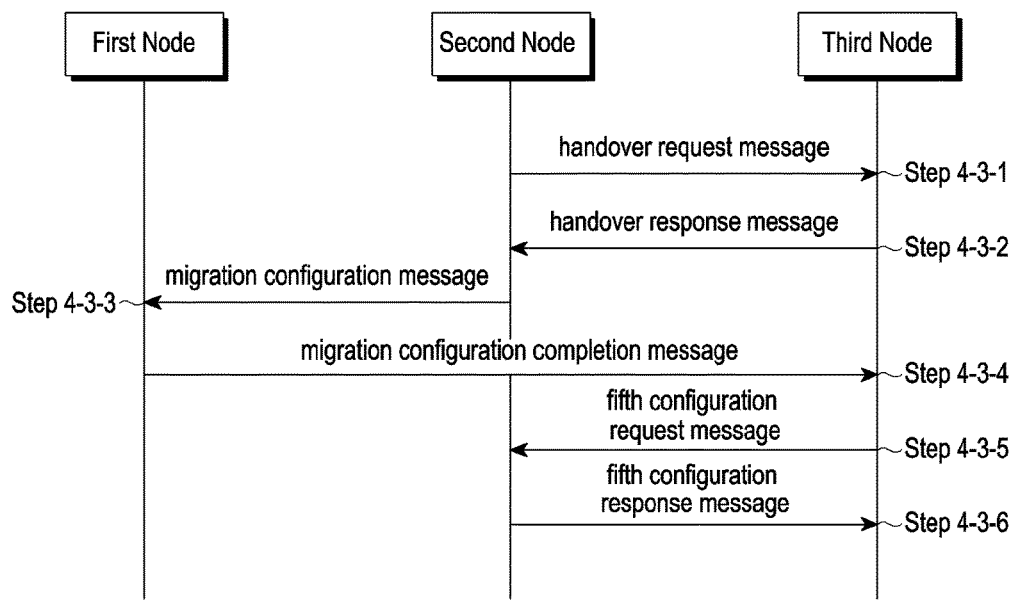
[Fig. 11]
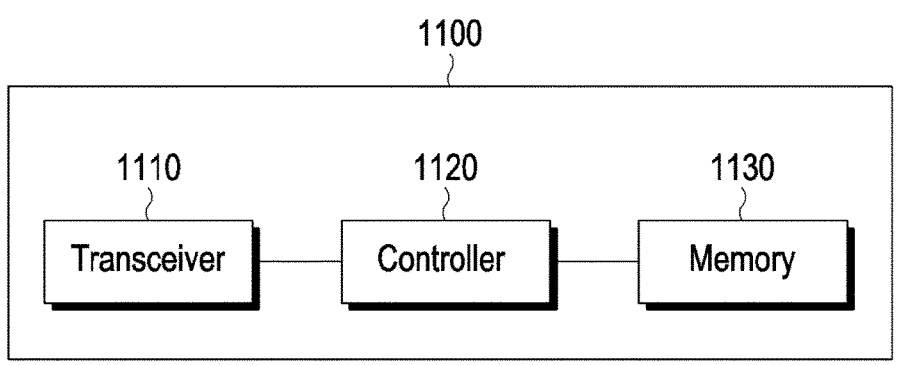

[Fig. 12]
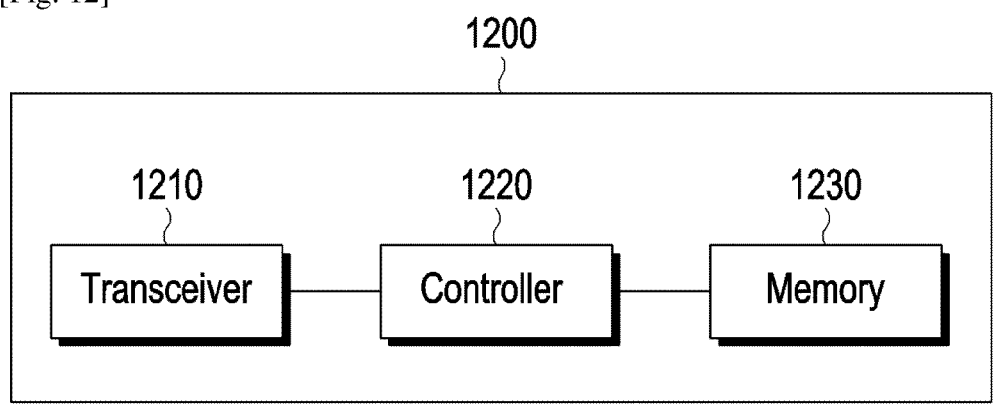

NODES IN COMMUNICATION NETWORK AND METHODS THEREOF

CROSS-REFERENCE TO RELATED APPLICATION(S)

This application is a National Phase Entry of PCT International Application No. PCT/KR2021/000892, which was filed on Jan. 22, 2021, and claims priority to Chinese Patent Application No. 202010075348.2 filed on Jan. 22, 2020 and Chinese Patent Application No. 202010340296.7 filed on Apr. 26, 2020, and Chinese Patent Application No. 202011206163.7 filed on Nov. 2, 2020, the content of each of which are incorporated herein by reference.

TECHNICAL FIELD

The application relates to wireless communication technology for handover of user equipment in a multi-hop network, and the disclosure relates to a device and a method for interacting user-related contexts between central units and distributed units of a base station.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyperconnectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In the research of NR (New Radio access) network Release 16, the topic of IAB (Integrated Access and Backhaul) is proposed, in order to extend the coverage of the network. The main purpose of the topic is to build a multi-hop network architecture. FIG. 1 shows a schematic architecture of a multi-hop network, in which a network architecture including one anchor node (IAB donor node) and two relay nodes (TAB nodes) is provided. Users in the multi-hop network can access the network through the anchor node (donor node), a distributed unit of the anchor node (donor node), or the relay node, for example, users 1/2/3 access the relay network through the distributed unit of the anchor node (donor node), the distributed unit portion of relay node 1 and the distributed unit portion of relay node 2, respectively. The anchor node (donor node) may be an integrated base station or a base station consists of a central unit (CU) (IAB-donor central unit) and a distributed unit (DU) (IAB-donor distributed unit). The relay node comprises a mobile terminal portion and a distributed unit portion, where the mobile terminal portion is used for communicating with a node at a higher level (parent level) of the relay node (e.g., the mobile terminal portion of relay node 1 is used for communicating with an anchor node (donor node) or a distributed unit of the anchor node (donor node), and the mobile terminal portion of relay node 2 is used for communicating with the distributed unit portion of relay node 1), and the distributed unit portion is used for communicating with a node at a lower level (child level) of the relay node (e.g., the distributed unit portion of relay node 1 is used for communicating with user 2, and can also be used for communicating with the mobile terminal portion of relay node 2). Because the mobile terminal portion of the relay node can be regarded as a user accessing the network, it has the function of a common user (non-relay node) (for example, the mobile terminal portion can establish a Signaling Radio Bearer (SRB) with a node at a higher level (parent level) to transmit a Radio Resource Control (RRC) message, and can also establish a Data Radio Bearer (DRB) to transmit data). Protocol stacks included in the central unit of the anchor node (donor node) comprise: protocol stacks for serving a control plane including a radio resource control (RRC) protocol layer and a packet data convergence protocol (PDCP) layer, and protocol stacks for serving a user plane including service data adaptation protocol (SDAP) layer and a PDCP layer. Protocol stacks included in the distributed unit of the anchor node (donor node) or the distributed unit portion of the relay node comprise: protocol stacks for serving the control plane and the user plane, including a radio link control (RLC) protocol layer, a Medium Access Control (MAC) protocol layer, and a physical (PHY) layer. The interfaces between the central unit of the anchor node (donor node) and the distributed unit of the anchor node (donor node), and between the central unit of the anchor node (donor node) and the distributed unit portion of the relay node are F1 interfaces (see 3GPP TS38.473).

In a relay network, the link between a relay node and an anchor node (donor node) or a distributed unit of the anchor node (donor node), or between relay nodes is a backhaul link, on which one or more different Backhaul Link Channels (such as Backhaul Link Channel 1 and Backhaul Link Channel 2 in FIG. 1, wherein the backhaul link channel 1 is located between the anchor node (donor node) and relay node 1, and the backhaul link channel 2 is located between relay node 1 and relay node 2) are established. An example of a backhaul link channel is a backhaul link radio link control (RLC) protocol layer channel, i.e., a Backhaul Link RLC channel. In a relay network, each backhaul link channel is used for transmitting data packets belonging to the same user or different users. The data packet may be a user data radio bearer (DRB) data packet, a user Signaling Radio Bearer (SRB) data packet, a control plane data packet on F1 interface, a user plane data packet on F1 interface, a non-F1 interface data packet (such as Internet Protocol Security (IPSec) data packet, a Stream Control Transmission Protocol (SCTP) data packets, and an Operation Administration and Maintenance (OAM) data packets, etc.).

In order to realize the transmission of user data in a multi-hop relay network, 3GPP has defined a new protocol layer, i.e. Backhaul Adaptation Protocol Layer (BAP). This protocol layer is configured in the distributed unit of an anchor node (donor node) and a relay node (such as the mobile terminal portion of the relay node and/or the distributed unit portion of the relay node), and is located above the RLC layer. This protocol layer is mainly used for the routing of a data packet and the mapping of the data packet. The routing of the data packet refers to transmitting the received data packet to the correct next hop node so that the data packet can be received by the destination receiving node of the data packet. The destination receiving node may be a relay node, an anchor node (donor node), a distributed unit of an anchor node (donor node), or a central unit of an anchor node (donor node). If the destination receiving node is a relay node, it means that the data packet is the data packet for the relay node, such as the data packet of control signaling of F1 interface that the distributed unit portion of the relay node needs to receive, the data packet of the user accessing the relay node, etc. The mapping of the data packet refers to transmit the data packet over the correct backhaul link channel.

For nodes (such as a relay node, or a distributed unit of an anchor node (donor node), or a central unit of an anchor node (donor node), or an anchor node (donor node)) in the relay network, a new address information (such as BAP Address) is defined, and the new address information can be used for indicating a node in the relay network and for routing of the data packet in the relay network. If the data packet includes BAP address of a node (such as a relay node, or a distributed unit of an anchor node (donor node), or central unit of an anchor node (donor node), or an anchor node (donor node)), it indicates that the node is the destination receiving node of the data packet, or that the node is the source transmitting node of the data packet. Meanwhile, there may be multiple transmission paths between an anchor node (donor node) (or the central unit of the anchor node (donor node) or the distributed unit of the anchor node (donor node)) and a relay node. In order to indicate different transmission paths, a path identifier (Path ID) is also defined. Different path identifiers indicate different paths to the same node. The data packet may also include the path identifier of the data packet. When a node in a relay network receives a data packet, it will determine the next hop node of the data packet according to the BAP address and/or the Path ID included in the data packet, thereby completing the routing of the data packet.

The above information is provided only as background information to help the understanding of the present disclosure. Regarding the present disclosure, no decision has been made and no statement has been made as to whether any of the above may be applicable to the prior art.

DISCLOSURE OF INVENTION

Technical Problem

The current research assumes that an anchor node (donor node) connected by a relay node will not change, but in the actual network, the anchor node (donor node) connected by the relay node will change, that is, the relay node will migrate (or handover) between different anchor nodes (donor nodes), due to some reasons (such as load balancing, movement of the relay node etc.). In the present disclosure, the migration and handover of the relay node are not distinguished and are used interchangeably. During the process of migration, users accessing the relay node will also be affected. Traditional technology cannot support the migration of the relay node well. The main problems are how to update the configuration of users served by the relay node in the migration process of the relay node, and how to reduce signaling overhead in the configuration update process.

The traditional solution is that in the migration process of the relay node, connections of all users and the relay node are disconnected, and then each user starts reestablish processes, thereby reestablishing the connections with the network.

Solution to Problem

According to an aspect of the present disclosure, there is provided a method performed by a first node in a communication system, comprising: receiving a first configuration message from a second node; and transmitting a first configuration completion message to a third node, wherein before receiving the first configuration message from the second node, a first request message is transmitted from the second node to the third node and a first response message is transmitted from the third node to the second node.

According to another aspect of the present disclosure, there is provided a method performed by a second node in a communication system, comprising: transmitting a first request message to a third node; receiving a first response message from the third node; and transmitting a first configuration message to a first node, wherein a first configuration completion message is transmitted from the first node to the third node after transmitting the first configuration message to the first node.

According to yet another aspect of the present disclosure, there is provided a method performed by a third node in a communication system, comprising: receiving a first request message from a second node; transmitting a first response message to the second node; and receiving a first configuration completion message from the first node, wherein a first configuration message is transmitted from the second node to the first node before receiving the first configuration completion message from the first node.

In the method of the present disclosure, the first request message may be a handover request message for a first node, and may include at least one of first user configuration information, first backhaul link channel configuration information, first address-related information, and first configuration information of aggregated data; the first response message may be a handover response message for the first node, and may include at least one of second user configuration information, second mapping relation information, second backhaul link channel configuration information, and second address-related information; and the first configuration message may be used for providing the required configuration information of the first node for migration and/or after the migration, and may include at least one of third user configuration information, third mapping relation information, third backhaul link channel configuration information, and third address-related information.

In the method of the present disclosure, the first user configuration information, the second user configuration information, and the third user configuration information are configuration information of a user served by the first node, and may include at least one of an identifier of the user and information related to a radio bearer of the user, respectively.

In the method of the present disclosure, the information related to a radio bearer of a user may include at least one of the following information: an identifier of the user, identification information of the radio bearer of the user, identification information, information related to quality of service (QoS) of the radio bearer, configuration information for serving the radio bearer of the user, information related to QoS satisfied by a relay node, information related to QoS satisfied by a non-relay node, information related to a tunnel of uplink data, information related to a tunnel of downlink data, information related to data forwarding, first tunnel information, and second tunnel information.

In the method of the present disclosure, the second mapping relation information and the third mapping relation information may reflect mapping relations between information used by the first node before migration and information used by the first node after the migration, and may include at least one of the following information: mapping information of an address, mapping information of a tunnel, mapping information of a routing identifier, mapping information of a next hop node, mapping information of a backhaul link channel, applicable information, and exception information.

According to another aspect of the present disclosure, there is provided a method performed by a first node in a communication system, comprising: receiving a first configuration request message from a fourth node; and transmitting a first configuration response message to the fourth node.

According to another aspect of the present disclosure, there is provided a method performed by a fourth node in a communication system, comprising: transmitting a first configuration request message to a first node; and receiving a first configuration response message from the first node.

In the method of the present disclosure, the first configuration request message may be used for configuration update of the first node, and may include at least one of the fifth address-related information, fifth user configuration information, and fifth mapping relation information; and the first configuration response message may be used for acknowledgment of the first configuration request message and may include at least one of sixth user configuration information and sixth mapping relation information.

In the method of the present disclosure, the fifth user configuration information may be used for providing updated configuration information for each user of the first node respectively by the fourth node, and the fifth mapping relation information may be used for updating multiple configurations simultaneously by the first node.

In the method of the present disclosure, the sixth user configuration information can be used for providing updated configuration information for each user respectively by the first node, and the sixth mapping relation information can be used for updating multiple configurations simultaneously by the fourth node.

According to another aspect of the present disclosure, there is provided a method performed by a fifth node in a communication system, comprising: transmitting a third configuration request message to a sixth node; and receiving a third configuration response message from the sixth node.

According to another aspect of the present disclosure, there is provided a method performed by a sixth node in a communication system, comprising: receiving a third configuration request message from a fifth node; and transmitting a third configuration response message to the fifth node.

In the method of the present disclosure, the third configuration request message may be used for providing configuration information related to data served by the first node, and may include at least one of seventh user configuration information and first control signaling-related information; and the third configuration response message may be used for providing configuration information related to data served by the first node, and may include at least one of eighth user configuration information, second control signaling-related information, and eighth mapping relation information.

In the method of the present disclosure, the sixth node may know configuration information of data of users accessing the first node from the seventh user configuration information.

In the method of the present disclosure, the eighth mapping relation information may be used for updating configuration information used by the first node in data transmission.

According to another aspect of the present disclosure, there is provided a method performed by a fifth node in a communication system, comprising: receiving a fifth configuration request message from a sixth node; and transmitting a fifth configuration response message to the sixth node.

According to another aspect of the present disclosure, there is provided a method performed by a sixth node in a communication system, comprising: transmitting a fifth configuration request message to a fifth node; and receiving a fifth configuration response message from the fifth node.

In the method of the present disclosure, the fifth configuration request message may be used for updating to the fifth node configuration information serving data of the first node, and may include at least one of eighth user configuration information and third control signaling-related information; and the fifth configuration response message may be used for feeding back the result of configuration update and may include at least one of ninth user configuration information and fourth control signaling-related information.

According to yet another aspect of the present disclosure, there is also provided a node for performing one of the above methods, including an anchor node (donor node) and a relay node.

Advantageous Effects of Invention

One technical effect of the present disclosure is that the configuration information of users at the relay node is updated by interacting of the user configuration information in the process of or after completion of the migration of the relay node, thereby enabling to provide continuous services to the user and reducing signaling interaction.

Other aspects, advantages and salient features of the present disclosure will become apparent to those skilled in the art from the following detailed description of various embodiments of the disclosure disclosed in conjunction with the accompanying

DRAWINGS

Brief Description of Drawings

FIG. 4 is an example of a migration process of a relay node according to an embodiment of the present disclosure.

FIG. 5 is an example of a configuration update process of a relay node according to an embodiment of the present disclosure.

FIG. 6 is an example of a configuration interaction process of a relay node according to an embodiment of the present disclosure.

FIG. 7 is another example of a configuration interaction process of a relay node according to an embodiment of the present disclosure.

FIG. 8 is an example of a migration and configuration update process of a relay node according to an embodiment of the present disclosure.

FIG. 9 is an example of a migration and configuration interaction process of a relay node according to an embodiment of the present disclosure.

FIG. 10 is another example of a migration and configuration interaction process of a relay node according to an embodiment of the present disclosure.

FIG. 11 is a block diagram of an anchor node (donor node) according to an embodiment of the present disclosure.

FIG. 12 is a block diagram of a relay node according to an embodiment of the present disclosure.

MODE FOR THE INVENTION

Figure 1:
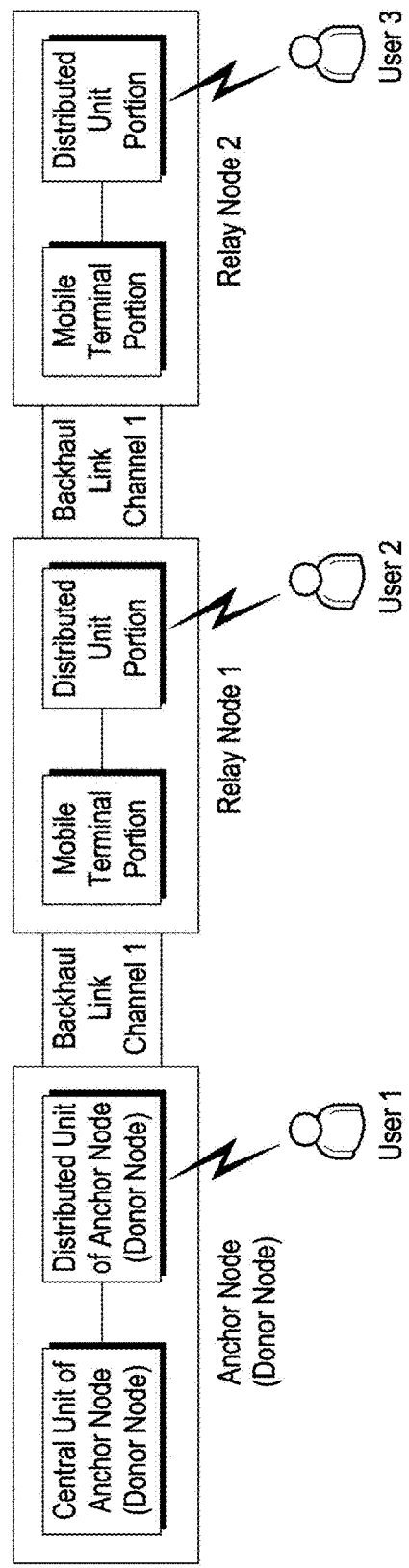
FIG. 1 is a schematic architecture of a multi-hop network.

The following description with reference to the accompanying drawings is provided to assist in a comprehensive understanding of the various embodiments of the present disclosure as defined by the claims and their equivalents. It includes various specific details to aid this understanding, but these details are to be considered as exemplary only. Therefore, those skilled in the art will recognize that various changes and modifications can be made to the various embodiments described herein without departing from the scope and spirit of the present disclosure. In addition, descriptions of well-known functions and configurations may be omitted for clarity and conciseness.

The terms and expressions used in the following description and claims are not limited to written meanings, but are only used by the inventors to enable a clear and consistent understanding of the present disclosure. Therefore, those skilled in the art should understand that the following description of various embodiments of the present disclosure is provided for illustrative purposes only and is not intended to limit the purpose of the present disclosure, which is defined by the appended claims and their equivalents.

It should be understood that the singular forms "a", "an" and "the" include plural referents unless the context clearly dictates otherwise.

In addition, the detailed description of the embodiments of the present disclosure is mainly based on wireless communication systems of multi-hop networks, in particular relay networks, but the subject matter of the present disclosure with slight changes can be applied to other communication systems with similar technical background and channel forms, which can be determined by those skilled in the art, without departing from the scope of the present disclosure.

The advantages and features of the present disclosure and the manner in which they are implemented will become apparent by referring to various embodiments described in detail below in conjunction with the accompanying drawings. However, the present disclosure is not limited to the embodiments set forth below, but may be implemented in various forms. The following embodiments are provided only to fully disclose the present disclosure and to inform those skilled in the art of the scope of the present disclosure, and the present disclosure is defined only by the scope of the appended claims. Throughout the specification, the same or similar reference numerals designate the same or similar elements.

Here, it will be understood that each step in the flowchart illustration and combinations of steps in the flowchart illustration may be implemented by computer program instructions. These computer program instructions may be provided to a processor of a general purpose computer, a special purpose computer, or other programmable data processing apparatus to produce a machine, such that the instructions that execute via the processor of the computer or other programmable data processing apparatus create means for implementing the functions specified in the flowchart. These computer program instructions may also be stored in a computer usable or computer readable memory that can direct a computer or other programmable data processing apparatus to function in a particular manner such that the instructions stored in the computer usable or computer readable memory produce an article of manufacture including instruction means that implement the functions specified in the flowchart. The computer program instructions may also be loaded onto a computer or other programmable data processing apparatus such that a series of operations performed on the computer or other programmable apparatus produce a computer implemented process such that the instructions that execute on the computer or other programmable apparatus provide operations for implementing the functions specified in the flowchart.

Also, each block in the flowchart illustration may represent a module, segment, or portion of code that includes one or more executable instructions for implementing the specified logical function(s). It should also be noted that the functions or steps labeled in the flowchart may occur out of order in some alternative implementations. For example, depending on the functions involved, the two steps shown in succession may actually be executed substantially simultaneously, or sometimes the steps may be executed in the reverse order. In some cases, multitasking and parallel execution may be advantageous.

As used herein, "unit" or "module" refers to a software element or a hardware element that performs a predetermined function, such as a field programmable gate array (FPGA) or an application specific integrated circuit (ASIC). However, "unit" or "module" is not always limited to the meaning of software or hardware. A "unit" or "module" may be configured to be stored in an addressable storage medium or to perform one or more processors. Thus, "unit" or "module" includes, for example, software elements, object-oriented software elements, class elements or task elements, processes, functions, attributes, procedures, subroutines, segments of program code, drivers, firmware, microcodes, circuits, data, databases, data structures, tables, arrays, and parameters. Elements and functions provided by "unit" or "module" may be combined into a smaller number of elements, "units" or "modules" or divided into a larger number of elements, "units" or "modules". In addition, an element "unit" or "module" may be implemented to reproduce one or more central processing units (CPUs) within a device or secure multimedia card.

Aspects of the present disclosure as generally described herein and illustrated in the accompanying drawings may be arranged, replaced, combined, separated, and designed in a variety of different configurations, all of which can be contemplated herein. In addition, the features shown in each drawing may be used in combination with each other unless the context otherwise indicates. Accordingly, the drawings should be generally regarded as a constituent part of one or more general embodiments, and it should be understood that not all illustrated features are necessary for each embodiment.

It will be understood that although the words "first", "second", and the like may be used herein to describe different elements, components, and/or portions, these elements, components, and/or portions should not be limited by these words. These words are only used for distinguishing one element, component and/or part from another element, component and/or part. Thus, the first element, the first component and/or the first portion discussed below may also be referred to as the second element, the second component and/or the second portion without departing from the teachings of the present disclosure.

The terminology used herein is for the purpose of describing particular embodiments only and is not intended to limit the disclosure. It will also be understood that when the words "comprise" and/or "include" are used in this specification, it indicates the presence of the described features, integers, steps, operations, elements, and/or components, but does not preclude the presence or addition of one or more other features, integers, steps, operations, elements, and/or components, and any combination thereof.

Unless otherwise defined, all terms (including technical terms and scientific terms) used herein have the same meaning as commonly understood by those skilled in the art to which this disclosure belongs. It will also be understood that terms, such as those defined in commonly used dictionaries, should be interpreted to have meanings consistent with their meanings in the context of the relevant fields, and should not be interpreted ideally or excessively formally unless explicitly so defined herein.

1. Composition of the Disclosure

The disclosure generally includes three aspects: a migration process of a relay node; a configuration update process of the relay node; and a configuration interaction process of the relay node. The present disclosure is not limited to the above three aspects, and includes any step in the exemplary methods of the three aspects and any combination thereof.

2. Embodiments of the Disclosure

The names of the messages in the present disclosure are only exemplary, and other names for the messages may also be used.

The expression of, e.g., "first" and "second", etc., included in the names of the messages or information used in the present disclosure are used for describing different messages or information, and do not indicate the order in which the messages or information are transmitted.

Detailed descriptions of steps unrelated to the present disclosure are omitted in the present disclosure.

The migration of a relay node considered in the present disclosure can also be considered as handover of the relay node.

Figure 2:
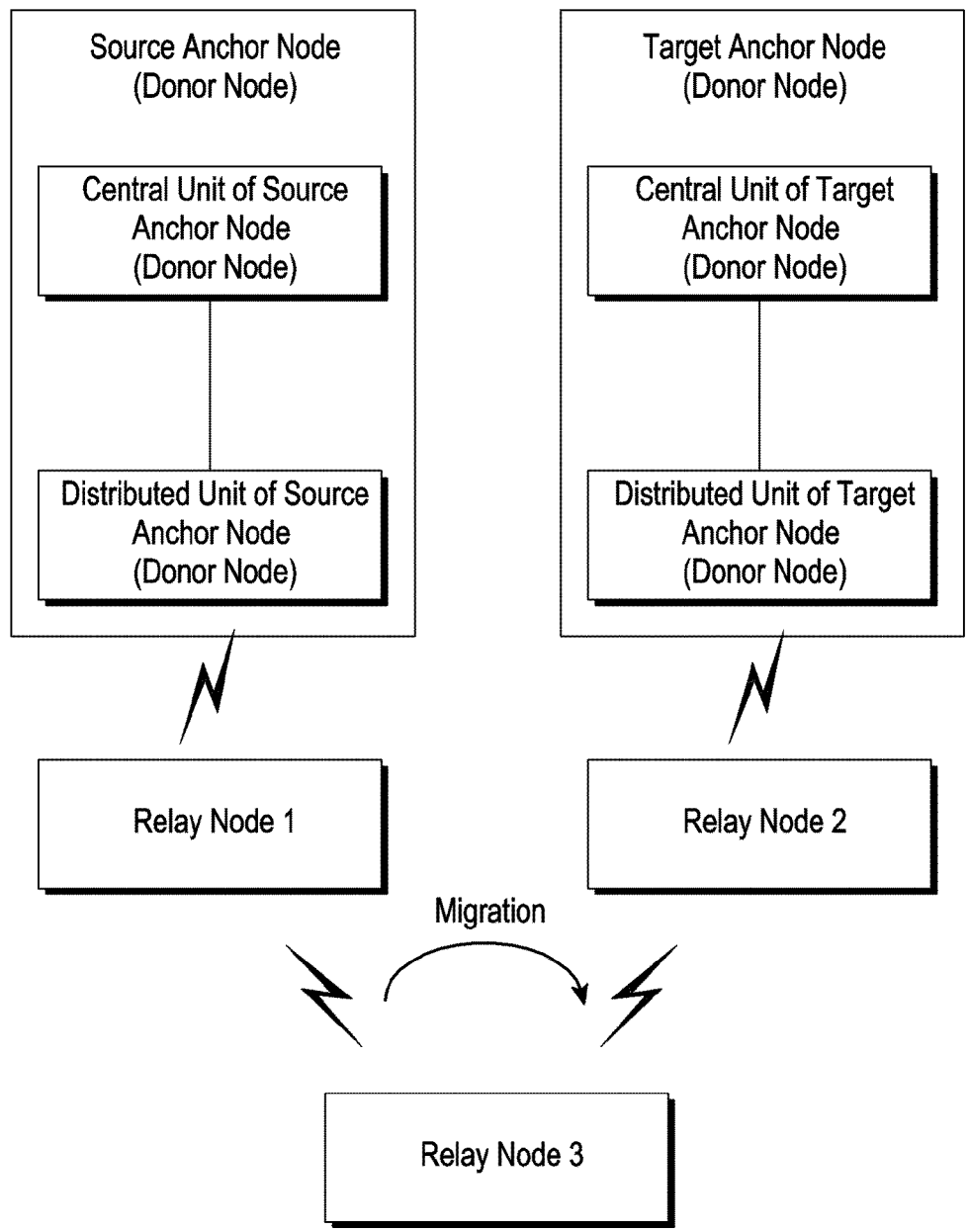
FIG. 2 is an example of a migration of a relay node according to an embodiment of the present disclosure.

FIG. 2 is an example of a migration of a relay node according to an embodiment of the present disclosure. As shown in FIG. 2, before a relay node 3 migrates, the relay node 3 accesses network (e.g., connected to a source anchor node (donor node)) through a relay node 1. After the migration, relay node 3 accesses the network (for example, connected to a target anchor node (donor node)) through a relay node 2. In FIG. 2, the relay node 1 and the relay node 2 are respectively connected with different anchor nodes (donor nodes). More specifically, the relay node 1 is connected with the source anchor node (donor node), while the relay node 2 is connected with the target anchor node (donor node). It should be noted that in order to simplify the explanation, there is only one relay node 1 between the relay node 3 and the source anchor node (donor node) before the migration in FIG. 2. However, in the actual network, the relay node 3 can be directly connected with the source anchor node (donor node), or can be connected with the source anchor node (donor node) through one or more relay nodes. Similarly, after the migration, the relay node 3 can be directly connected with the target anchor node (donor node) or can be connected with the target anchor node (donor node) through one or more relay nodes.

For convenience of explanation, the following description of the present disclosure takes the network shown in FIG. 2 as an example, but the application scope of the mechanism in the present disclosure is not limited to the network shown in FIG. 2.

Figure 3:
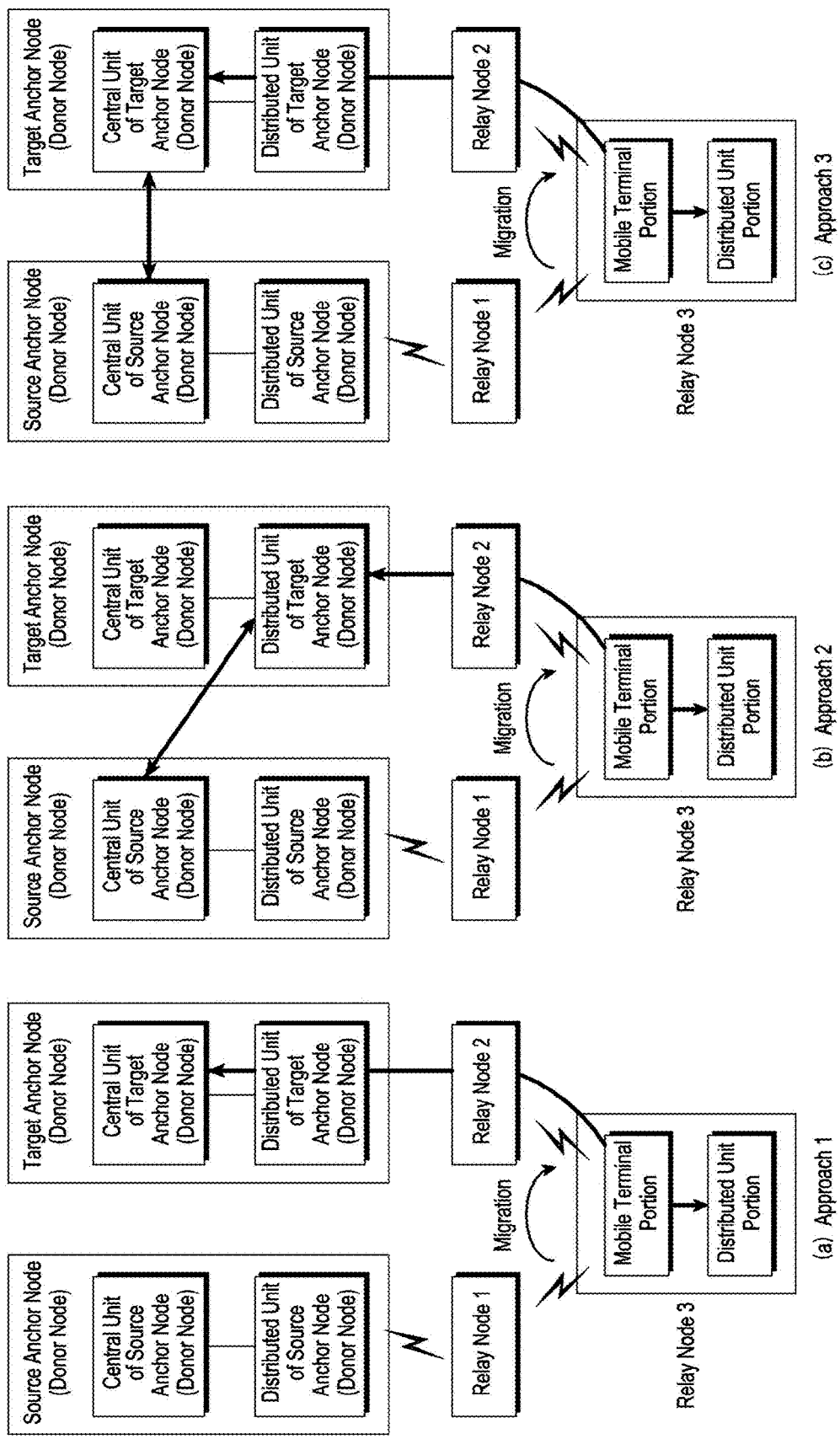
FIG. 3 is an example of a method of data transmission after the migration of a relay node according to an embodiment of the present disclosure.

In a migration process of a relay node, different migration mechanisms lead to different methods for the relay node to transmit data after the migration. FIG. 3 is an example of a method of data transmission after a migration of a relay node according to an embodiment of the present disclosure. The disclosure considers the following three approaches to transmit data of a relay node:

(1) Approach 1: after the migration, the distributed unit portion of the relay node is connected with the central unit of the target anchor node (donor node), as shown in FIG. 3(*a*), and the transmission paths of the data of the distributed unit portion of a relay node 3 (e.g., the data of users served by the distributed unit portion of the relay node 3 and the data generated by the distributed unit portion of the relay node 3 (e.g., F1AP signaling)) are as follows:

Uplink: the distributed unit portion of the relay node 3→a relay node 2→a distributed unit of a target anchor node (donor node)→a central unit of the target anchor node (donor node)

Downlink: the central unit of the target anchor node (donor node)→the distributed unit of the target anchor node (donor node)→the relay node 2→the distributed unit portion of the relay node 3

In this approach, the users served by the relay node need to be migrated to the target anchor node (donor node) all together, so that configuration interaction related to each user needs to be performed between the source anchor node (donor node) and the target anchor node (donor node) in the migration process. After the migration is completed, the relay node is controlled by the target anchor node (donor node), while the backhaul link channels serving the relay node (the backhaul link channel between the relay node 3 and the relay node 2, and the backhaul link channel between the relay node 2 and distributed unit of the target anchor node (donor node), as shown in FIG. 3(*a*)) are also controlled by the target anchor node (donor node), and the transmission paths between the relay node and the target anchor node (donor node) are also controlled by the target anchor node (donor node). The approach has the beneficial effect that the data transmissions of the relay node after the migration are completely controlled by the target anchor node (donor node). However, this approach needs to complete the migrations of all users accessing the relay node in the migration process, which will lead to excessive signaling interaction and increase the latency of user migration.

(2) Approach 2: after the migration, the distributed unit portion of the relay node remains the connection with the central unit of the source anchor node (donor node), as shown in FIG. 3(*b*), and the transmission paths of the data of the distributed unit portion of the relay node 3 (e.g., the data of users served by the distributed unit portion of the relay node 3, and the data generated by the distributed unit portion of the relay node 3 (e.g., F1AP signaling)) are as follows:

Uplink: the distributed unit portion of the relay node 3→a relay node 2→a distributed unit of a target anchor node (donor node)→the central unit of the source anchor node (donor node)

Downlink: the central unit of the source anchor node (donor node)→the distributed unit of the target anchor node (donor node)→the relay node 2→the distributed unit portion of the relay node 3

In this approach, a handover only takes place in the mobile terminal portion of the relay node, and the distributed unit portion of the relay node remains the connection with the central unit of the source anchor node (donor node), so that the users accessing the relay node are still connected with the source anchor node (donor node). This approach has the beneficial effects of reducing the interaction of configuration information related to users in the migration process, and reducing the configuration update for each user, thereby reducing the signaling interaction. On the other hand, the data of the distributed unit portion of the relay node is carried by a backhaul link channel between the relay node 3 and the relay node 2 and a backhaul link channel between the relay node 2 and the distributed unit of the target anchor node (donor node), and the configurations of these channels are controlled by the target anchor node (donor node), and the transmission paths of the data of the distributed unit portion of the relay node are also controlled by the target anchor node (donor node). Thus, the method requires the source anchor node (donor node) to provide the target anchor node (donor node) with relevant configuration information for transmitting the data of the distributed unit portion of the relay node, thereby assisting the target anchor node (donor node) in the configuration of the backhaul link channels and the transmission paths. Also, the target anchor node (donor node) needs to provide the source anchor node (donor node) with the configuration information related to the data transmission, thereby assisting the source anchor node (donor node) in performing the data transmission and configuration according to the configuration of the target anchor node (donor node). In this manner, after the migration of the relay node is completed, the signaling interaction between the source anchor node (donor node) and the target anchor node (donor node) needs to be maintained, thereby configuration related to the data transmission of the distributed unit portion of the relay node is performed.

(3) Approach 3: after the migration, a distributed unit portion of the relay node remains the connection with a central unit of a source anchor node (donor node), as shown in FIG. 3(*c*), transmission paths of the data of a distributed unit portion of a relay node 3 (e.g., the data of users served by the distributed unit portion of the relay node 3, and the data generated by the distributed unit portion of the relay node 3 (e.g., F1AP signaling)) are as follows:

Uplink: the distributed unit portion of the relay node 3→a relay node 2→a distributed unit of a target anchor node (donor node)→a central unit of the target anchor node (donor node)→a central unit of a source anchor node (donor node)

Downlink: the central unit of the source anchor node (donor node)→the central unit of the target anchor node (donor node)→the distributed unit of the target anchor node (donor node)→the relay node 2→the distributed unit portion of the relay node 3

The approach is similar to approach 2 except that the data transmission between the distributed unit portion of the relay node and the central unit of the source anchor node (donor node) needs to be transmitted via the central unit of the target anchor node (donor node). This approach has the beneficial effects of reducing the interaction of configuration information related to users in the migration process, and reducing the configuration update for each user, thereby reducing the signaling interaction. On the other hand, similar to approach 2, after the migration of the relay node is completed, the signaling interaction between the source anchor node (donor node) and the target anchor node (donor node) needs to be maintained, and thereby configuration related to the data transmission of the distributed unit portion of the relay node is performed.

It should also be noted that although the following embodiments (including embodiments 1-1-1 to 1-3-2 and embodiments 4-1 to 4-3, etc.) are described herein in connection with FIG. 3, since after the migration of the relay node 3 in FIG. 3, the relay node 2 is the only relay node on the message transmission path between relay node 3 and the target anchor node (donor node), and has no special contribution to the updating of the configuration information of the users served by the relay node 3. As a result, only the message transmission between the relay node where the migration occurs and the source and/or the target anchor node (donor node) is concerned and described, and the related description of the relay node 2 is omitted, in the steps of each process described with reference to FIGS. 4 to 10.

The nodes involved in the disclosure are as follows:

First node: a relay node or a distributed unit portion of the relay node

Second node: a source node, which may be an anchor node (donor node), or a central unit of the anchor node (donor node), or a control plane portion of the central unit of the anchor node (donor node), or a user plane portion of the central unit of the anchor node (donor node)

Third node: a target node, which may be an anchor node (donor node), or a central unit of the anchor node (donor node), or a control plane portion of the central unit of the anchor node (donor node), or a user plane portion of the central unit of the anchor node (donor node)

Fourth node: an anchor node (donor node), or a central unit of the anchor node (donor node), or a control plane portion of the central unit of the anchor node (donor node), or a user plane portion of the central unit of the anchor node (donor node); in one embodiment, the fourth node may be the third node mentioned above, or the second node mentioned above, or other nodes Fifth node: an anchor node (donor node), or a central unit of the anchor node (donor node), or a control plane portion of the central unit of the anchor node (donor node), or a user plane portion of the central unit of the anchor node (donor node); in one embodiment, the fifth node may be the second node mentioned above, or other nodes Sixth node: an anchor node (donor node), or a central unit of the anchor node (donor node), or a control plane portion of the central unit of the anchor node (donor node), or a user plane portion of the central unit of the anchor node (donor node); in one embodiment, the sixth node may be the third node mentioned above, or other nodes The second node and the third node mentioned above may be the same node or different nodes.

The key information involved in the present disclosure is as follows:

Configuration information of a user, the user is a user accessing a relay node, the information including at least one of the following information:

An identifier of the user, such as gNB-Central Unit/Distributed Unit User Equipment F1 Application Protocol Identifier (gNB-CU/DU UE F1AP ID), Cell-Radio Network Temporary Identifier (C-RNTI), User Equipment Xn Application Protocol Identifier (UE XnAP ID)

Information related to a radio bearer of the user, for a radio bearer (such as data radio bearer (DRB), signaling radio bearer (SRB)), the information including at least one of the following information:

An identifier of the user, such as gNB-CU/DU UE F1AP ID, C-RNTI, UE XnAP ID

Identification information of the radio bearer of the user, such as UE RB ID, which can indicate a radio bearer of a specific user, in other words, this identification information indicates not only a user but also a radio bearer of the user Identification information, such as DRB ID, SRB ID Information related to the Quality of Service (QoS) of the radio bearer, which includes configuration information of the QoS parameters of the radio bearer, the QoS parameters include but are not limited to, non-dynamic 5QI descriptor, dynamic 5QI descriptor, allocation and retention priority, GBR QoS flow information, etc. (see 3GPP TS38.473 for specific information). In one embodiment, the information is the actual QoS information of the radio bearer; in another embodiment, the information is QoS information that needs to be satisfied by a receiving node, then the QoS information is different from the above-mentioned "actual QoS information of the radio bearer"

Configuration information for serving the radio bearer of the user, such as SDAP layer configuration, PDCP layer configuration, RLC layer configuration, configuration information of a logical channel of the radio bearer (such as identification information and priority information of the logical channel), (see CellGroupConfiguration)

Information related to QoS satisfied by the relay node, which is used for indicating information related to the QoS that the relay node can satisfy when serving the radio bearer, is different from the above-mentioned "Information related to the QoS of the radio bearer". The information has the beneficial effect that the node receiving the information can know the QoS that the relay node can satisfy when serving the radio bearer of the user, and determine how to configure other nodes to serve the radio bearer of the user, so that the relay node and other nodes jointly serve the radio bearer of the user and satisfy the QoS requirements of the radio bearer. Another beneficial effect is that the node receiving the information can configure the relay node to serve the radio bearer of the user according to the QoS indicated by the information as much as possible, so that there is no need to modify the configuration information of the relay node when serving the radio bearer of the user Information related to QoS satisfied by a non-relay node, which is used for indicating information related to the QoS that other nodes except the relay node in the network satisfy when jointly serving the radio bearer, is different from the "information related to QoS of the radio bearer" described above. The information has the beneficial effect that the node receiving the information can know the QoS required to be satisfied by other nodes except the relay node when serving the radio bearer of the user, and determine how to configure other nodes to serve the radio bearer of the user, so that the relay node and other nodes jointly serve the radio bearer of the user and satisfy the QoS requirement of the radio bearer. Another beneficial effect is that the node receiving the information can configure other nodes to serve the radio bearer of the user according to the QoS indicated by the information as much as possible, so that there is no need to modify the configuration information of the relay nodes when serving the radio bearer of the user Information related to a tunnel of uplink data, the uplink data being the data that the relay node transmits to the anchor node (donor node); there may be one or more tunnels; the information indicates the information on a side of the anchor node (donor node), or the central unit of the anchor node (donor node), or the user plane side of the central unit of the anchor node (donor node), and for a tunnel, the information includes at least one of the following information:

Tunnel identification information, which can be used for indicating a tunnel; when the identification information is different, it indicates that the indicated tunnel is different An Internet Protocol (IP) address A Tunnel Endpoint identifier (TEID)

routing identification information, which is used for indicating the transmission paths of the uplink data (further, the uplink data being transmitted through the tunnel), includes address information (BAP address) and/or transmission path identification information (path ID) of the receiving node; further, according to the information, the relay node can add the information to the uplink data packet transmitted through the tunnel Identification information of a next hop node, the next hop node being the node that directly receives the uplink data when the relay node transmits the uplink data (further, the uplink data being transmitted through the above tunnel), in other words, the uplink data is transmitted by the relay node to the next hop node, and is then transmitted by the next hop node directly or indirectly (through other nodes) to the destination node of the uplink data. According to the information, the relay node knows the node to which the uplink data is transmitted Identification information of a backhaul link channel, the backhaul link channel being the backhaul link channel used by the relay node when transmitting the uplink data (further, the uplink data is transmitted through the above tunnel) to the next hop node. According to the information, the relay node knows which backhaul link channel is used for transmitting the uplink data One beneficial effect of including this information is that the receiving node can update the configuration of the uplink tunnel of the user data according to this information, and know the configuration of the uplink data transmission, such as the transmission path of the uplink data packet, the information to be added in the uplink data packet, the next hop node receiving the uplink data packet, and the backhaul link channel used for transmitting the uplink data packet; another beneficial effect of including this information is that the receiving node can know the configuration information of the uplink tunnel of the radio bearer served by the relay node, thereby helping the receiving node to update the configuration information of the uplink tunnel; another beneficial effect of including this information is that the receiving node can configure the uplink tunnel of the radio bearer served by the relay node according to the received information.

Information related to a tunnel of downlink data, the downlink data being the data that the anchor node (donor node) transmits to the relay node; there may be one or more tunnels; the information indicates the information of the relay node or the distributed unit portion of the relay node, and for a tunnel, the information includes at least one of the following information:

Tunnel identification information, which can be used for indicating a tunnel; when the identification information is different, it indicates that the indicated tunnel is different An IP address

A TEID

Information on the configuration value of a Differential Service Code Point (DSCP) field in the downlink data packet (further, the downlink data packet being transmitted through the above tunnel)

Information on the configuration value of a flow label field in a downlink data packet (further, the downlink data packet being transmitted through the above tunnel)

One beneficial effect of including this information is that the receiving node can update the configuration of the downlink tunnel of the user data according to this information, and know the configuration of downlink data transmission, such as the information included in the downlink data packet (such as the configuration value of the DSCP field, the configuration value of the flow label field); another beneficial effect of including this information is that the receiving node can know how to transmit downlink data to the relay node, such as the address of receiving downlink data, the information required to be included in the downlink data packet (such as the configuration value of the DSCP field and the configuration value of the flow label field); another beneficial effect of including this information is that the receiving node can configure the downlink tunnel of the radio bearer served by the relay node according to the received information.

Information related to data forwarding; the data forwarding means that node 1 (e.g., a source anchor node (donor node), or a central unit of the source anchor node (donor node), or a user plane portion of the central unit of the source anchor node (donor node)) transmits data of a radio bearer of a user to node 2 (e.g., a target anchor node (donor node), or a central unit of the target anchor node (donor node), or a user plane portion of the central unit of the target anchor node (donor node)), and the information related to data forwarding can help determine whether the data needs to be transmitted from node 1 to node 2, and can also help determine the address of node 2 to which the data is transmitted; the data being transmitted can be uplink data or downlink data; for uplink data or downlink data, the information includes at least one of the following information:

A suggestion on whether data forwarding is required

An IP address, which is the address on the node 2 side

A TEID, which is the TEID on the node 2 side

First tunnel information, which indicates address-related information used by the anchor node (donor node) when receiving user data from other anchor nodes (donor nodes); in one embodiment, after receiving the data, the anchor node (donor node) will forward the data to the relay node; the information includes at least one of the following information:

Tunnel identification information
An IP address
A TEID
Second tunnel information, which indicates address-related information used by the anchor node (donor node) when receiving user data from the relay node; in one embodiment, after receiving the data, the anchor node (donor node) will forward the data to other anchor nodes (donor nodes); the information includes at least one of the following information:
Tunnel identification information
An IP address
A TEID
Address-related information required by a relay node, which is the information related to an address required for communication between the relay node (or a distributed unit portion of relay node) and an anchor node (donor node) (or a central unit of the anchor node (donor node), or a control plane portion of the central unit of the anchor node (donor node), or a user plane portion of the central unit of the anchor node (donor node)), includes at least one of the following information:
  Information related to an address on the relay node side; the address indicated by the information may be the address on the relay node side or the distributed unit portion of the relay node, and the information includes at least one of the following information:
  Identification information of the address on the relay node side, which is used for indicating the address on the relay node side; when the identification information is different, it indicates that the indicated address on the relay node side is different
  BAP address information
  IP address information
  A TEID, such as a GTP-Tunnel Endpoint Identifier (GTP-TEID)
  Port information
  Information on the number of required addresses, which serves to inform the receiving node: the number of addresses required by the relay node; after receiving this information, the receiving node will provide the relay node with addresses according to this information
  Indication information of the usage, which indicates the useage of the above addresses; the usages that may be indicated include: a usage for transmitting user-related control signaling (such as UE-Associated F1AP (UE-Associated F1 Application Protocol)), a usage for transmitting non-user-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.
  Identification information of one or more users served; the address on the relay node side may serve one or more users
  Identification information of radio bearers of one or more user served, such as a UE RB ID, which can indicate a radio bearer of a specific user, in other words, the identification information indicates not only a user but also a radio bearer of the user
  Identification information of one or more radio bearers served, such as a RB ID
  Information related to an address on the anchor node (donor node) side; the address indicated by the information may be the address on the anchor node (donor node) side, or the address on the central unit side of the anchor node (donor node), or the address of the control plane portion of the central unit of the anchor node (donor node), or the address of the user plane portion of the central unit of the anchor node (donor node), and the information includes at least one of the following information:
  Identification information of the address on the anchor node (donor node) side, which is used for indicating the address on the anchor node (donor node) side; when the identification information is different, it indicates that the indicated address on the anchor node (donor node) side is different
  BAP address information
  IP address information
  A TEID, such as a GTP-Tunnel Endpoint Identifier (GTP-TEID)
  Port information
  Indication information of the usage, which indicates the usage of the above addresses; the usages that may be indicated include: a usage for transmitting user-related control signaling (such as UE-associated F1AP), a usage for transmitting nonuser-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.
  Identification information of one or more users served; the above address on the anchor node (donor node) side may serve the one or more users
  Identification information of radio bearers of one or more users served, such as UE RB ID, which can indicate a radio bearer of a specific user, that is, the identification information indicates not only a user but also a radio bearer of the user
  Identification information of one or more radio bearers served, such as a RB ID
Mapping-related information, which is used for reflecting an information update used by a relay node, includes at least one of the following information:
  Mapping information of an address, for a mapping of an address, the information including at least one of the following information:
  Identification information of the address on the relay node side, which is used for indicating the address on the relay node side; when the identification information is different, it indicates that the indicated address on the relay node side is different
  New information related to the address on the relay node side; the contents included in this information may be referred to the "information related to the address on the relay node side" within the "address-related information required by the relay node" described above
  Old information related to the address on the relay node side; the contents included in this information may be referred to the "information related to the address on the relay node side" within the "address-related information required by the relay node
  Identification information of the address on the anchor node (donor node) side, which is used for indicating the address on the anchor node (donor node) side; when the identification information is different, it indicates that the indicated address on the anchor node (donor node) side is different New information related to the address on the anchor node (donor node) side; the contents included in this information may be referred to the "information related to the address on the anchor node (donor node) side" within the "address-related information required by the relay node" described above Old information related to the address on the anchor node (donor node) side; the contents included in this information may be referred to the "information related to the address on the anchor node (donor node) side" within the "address-related information required by the relay node" described above Mapping information of tunnels, for a mapping of a tunnel, the information including at least one of the following information:

Identification information of the tunnel of uplink data, which can be used for indicating a certain uplink tunnel; when the identification information is different, it indicates that the indicated uplink tunnels are different; in one embodiment, the identification information may remain unchanged when the information related to the tunnel of the uplink data is updated. This information may be transmitted by the anchor node (donor node) to the relay node when configuring the uplink tunnel of the user, and may be, for example, information included in the UE Context Setup/Modification Request message for each tunnel of the uplink data New information related to the tunnel of the uplink data, the contents included in this information may be referred to the "information related to the tunnel of the uplink data" within the "configuration information of the user" described above Old information related to the tunnel of the uplink data; the content included in this information may be referred to the "information related to the tunnel of the uplink data" within the "configuration information of the user" described above Identification information of a tunnel of downlink data, which can be used for indicating a certain downlink tunnel; when the identification information is different, it indicates that the indicated downlink tunnels are different; in one embodiment, the identification information may remain unchanged when the information related to the tunnel of the downlink data is updated. This information may be transmitted by the relay node to the anchor node (donor node) when configuring the downlink tunnel of the user, and may be, for example, information included in the UE Context Setup/Modification Response message for each tunnel of the downlink data New information related to the tunnel of the downlink data; the contents included in this information may be referred to the "information related to the tunnel of the downlink data" within the "configuration information of the user" described above Old information related to the tunnel of the downlink data; the content included in this information may be referred to the "information related to the tunnel of the downlink data" within the "configuration information of the user" described above In a specific implementation, for a tunnel, the information related to the tunnel mapping may be included in signaling for transmission in the following form:

a. Identification information of the tunnel of uplink data
b. Old information related to the tunnel of the uplink data, such as an IP address, and/or a TEID
c. New information related to the tunnel of the uplink data, such as an IP address, and/or a TEID
d. routing identification information; in one implementation, the routing identification information is new routing identification information used in the uplink data transmission
e. Identification information of a next hop node; in one implementation, the information indicates identification information of a new next hop node used when receiving uplink data
f. Identification information of a backhaul link channel; in one implementation, the information indicates identification information of a new backhaul link channel used for uplink data transmission
g. Identification information of the tunnel of downlink data
h. Old information related to the tunnel of the downlink data, such as an IP address, and/or a TEID
i. New information related to the tunnel of the downlink data, such as an IP address, and/or a TEID In another implementation, for a user or a user bearer, the information related to the tunnel mapping can be transmitted in signaling in the following form, and the information included therein includes at least one of the following information:

a. Identification information of the user
b. Identification information of the user bearer, such as a DRB ID, an SRB ID, etc.
c. Information related to one or more tunnels, for a tunnel, the information including at least one of the following information:
a) Identification information of the tunnel of uplink data, which can be used for indicating a certain uplink tunnel; when the identification information is different, it indicates that the indicated uplink tunnels are different; In one implementation, the identification information may remain unchanged when the information related to the tunnel of the uplink data is updated
b) Old information related to the tunnel of the uplink data, such as an IP address, and/or a TEID
c) New information related to the tunnel of the uplink data, such as an IP address, and/or a TEID
d) routing identification information; in one implementation, the routing identification information is new routing identification information used in the uplink data transmission
e) Identification information of a next hop node; in one implementation, the information indicates identification information of a new next hop node used when receiving the uplink data
f) Identification information of a backhaul link channel; in one implementation, the information indicates identification information of a new backhaul link channel used for the transmission of the uplink data
g) Identification information of a tunnel of downlink data, which can be used for indicating a certain downlink tunnel; when the identification information is different, it indicates that the indicated downlink tunnels are different; in one embodiment, the identification information may remain unchanged when the information related to the tunnel of the downlink data is updated
h) Old information related to the tunnel of the downlink data, such as an IP address, and/or a TEID i) New information related to the tunnel of the downlink data, such as an IP address, and/or a TEID Mapping information of a transport network layer association, for a transport network layer association, the information including at least one of the following information:

New information of the transport network layer association on an anchor node (donor node) side, which includes at least one of the following information:

Identification information of the transport network layer association on the anchor node (donor node) side, which is used for indicating a transport network layer association on the anchor node (donor node) side; different identification information indicates different identifications of transport network layer associations on the anchor node (donor node) side IP address information Port information New indication information of the usage of the transport network layer association on the anchor node (donor node) side; the usages that may be indicated include: a usage for transmitting user-related control signaling (such as UE-associated F1AP), a usage for transmitting non-user-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.

Old information of the transport network layer association on the anchor node (donor node) side, which includes at least one of the following information:

Identification information of the transport network layer association on the anchor node (donor node) side, which is used for indicating one transport network layer association on the anchor node (donor node) side; different identification information indicates different identifications of transport network layer associations on the anchor node (donor node) side IP address information Port information Old indication information of the usage of the transport network layer association on the anchor node (donor node) side; the usages that may be indicated include: a usage for transmitting user-related control signaling (such as UE-associated F1AP), a usage for transmitting non-user-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.

New information of a transport network layer association on a relay node side, which includes at least one of the following information:

Identification information of the transport network layer association on the relay node side, which is used for indicating one transport network layer association on the relay node side; different identification information indicates different identifications of transport network layer associations on the relay node side IP address information Port information New indication information of the usage of the transport network layer association on the relay node side; the usages that may be indicated include: a usage for transmitting user-related control signaling (such as UE-associated F1AP), a usage for transmitting non-user-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.

Old information of the transport network layer association on the relay node side, which includes at least one of the following information:

Identification information of the transport network layer association on the relay node side, which is used for indicating one transport network layer association on the relay node side; different identification information indicates different identifications of transport network layer associations on the relay node side IP address information Port information Old indication information of the usage of the transport network layer association on the relay node side; the usages that may be indicated include: a usage for transmitting user-related control signaling (such as UE-associated F1AP), a usage for transmitting non-user-related control signaling (such as non-UE-associated F1AP), a usage for transmitting user-related control information and non-user-related control information, a usage for transmitting user data, a usage for transmitting control signaling type 1 data, a usage for transmitting control signaling type 2 data, a usage for transmitting control signaling type 3 data, etc.

Mapping information for non-user plane data transmission; for a certain type of non-user plane data, the information includes at least one of the following information:

Indication information of the type of the non-user plane data; the types that the indication information can indicate include a type for transmitting a user-related control signaling (e.g., UE-associated F1AP), a type for transmitting a non-user-related control signaling (e.g., non-UE-associated F1AP), and a type for transmitting non-F1 interface data New routing identification information Old routing identification information New identification information of the next hop node Old identification information of the next hop node New identification information of the backhaul link channel Old identification information of the backhaul link channel Mapping information of a routing identifier, for a mapping of a routing identifier, the information includes at least one of the following information:

New routing identification information

Old routing identification information the above routing identification information indicates a transmission path of data, which includes address information (BAP address) of a receiving node and/or indication information (path ID) of the data transmission path, and the routing identification information may be added to a transmitted data packet.

The mapping information of a next-hop node, for a mapping of a next-hop node, the information includes at least one of the following information:

New identification information of the next hop node
Old identification information of the next hop node
The above-mentioned next-hop node is a node that directly receives data when a relay node transmits the data, in other words, the data is transmitted by the relay node to the next-hop node, and then transmitted by the next-hop node directly or indirectly (through other nodes) to the destination node. Based on this information, the relay node knows the node to which the data is transmitted
  Mapping information of a backhaul link channel, for a mapping of a backhaul link channel, the information includes at least one of the following information:
New identification information of the backhaul link channel
Old identification information of the backhaul link channelT the above mentioned backhaul link channel is used for transmitting user data.
Applicable information, which indicates the information related to data applicable to the one or more mapping information described above, the information includes at least one of the following information:
Identification information of a user; there may be one or more users applicable to the one or more mapping information described above; the information may include the identification information of the one or more users
Information related to a radio bearer of the user; there may be one or more radio bearers of the users applicable to the one or more mapping information, and for a certain radio bearer, the information includes at least one of the following information:
Identification information of the user
Identification information of the radio bearer
Identification information of the radio bearer of the user, such as a UE RB ID, which can indicate a radio bearer of a specific user, in other words, this information indicates not only a user but also a radio bearer of the user
Information related to a tunnel of the radio bearer of the user, which includes at least one of the following information:
Information related to a tunnel of uplink data, such as an IP address, and/or a TEID
Information related to a tunnel of downlink data, such as an IP address, and/or a TEID
Information related to control signaling, there may be many types of control signaling applicable to the one or more mapping information described above; for a certain type of control signaling, the information includes at least one of the following information:
Type information of the control signaling, such as a user-related control signaling (e.g., UE-associated F1AP) and a non-user-related control signaling (e.g., non-UE-associated F1AP)
Identification information of the user to which the control signaling belongs
Exception information, which indicates the information related to data not applicable to the one or more mapping information described above, the information includes at least one of the following information:
The identification information of the user; there may be one or more users not applicable to the one or more mapping information described above, and the information may include the identification information of the one or more users
Information related to a radio bearer of the user; there may be one or more radio bearers of the users not applicable to the one or more mapping information described above, and for a certain radio bearer, the information includes at least one of the following information:
Identification information of the user
Identification information of the radio bearer
Identification information of the radio bearer of the user, such as a UE RB ID, which can indicate a radio bearer of a specific user, in other words, this identification information indicates not only a user but also a radio bearer of the user
Information related to a tunnel of the radio bearer of the user, which includes at least one of the following information:
Information related to a tunnel of uplink data, such as an IP address, and/or a TEID
Information related to a tunnel of downlink data, such as an IP address, and/or a TEID
Information related to a control signaling, there may be multiple types of control signaling not applicable to the above one or more mapping information. For a certain type of control signaling, the information includes at least one of the following information:
Type information of the control signaling, such as a user-related control signaling (e.g., UE-associated F1AP) and a non-user-related control signaling (e.g., non-UE-associated F1AP)
Identification information of the user to which the control signaling belongs Among the mapping information described above, the new information may be information used after the configuration update of a relay node, and the old information may be information used before the configuration update of the relay node. The configuration update of the relay node described above may be due to a change of an anchor node (donor node) (or a central unit of the anchor node (donor node), or a distributed unit of the anchor node (donor node), or a control plane portion of the central unit of the anchor node (donor node)) to which the relay node is accessed. In one example, the relay node migrates from an anchor node (donor node) 1 (which may correspond to the source anchor node (donor node) in FIG. 3) to an anchor node (donor node) 2 (which may correspond to the target anchor node (donor node) in FIG. 3); in this example, the mobile terminal portion of the relay node is switched from the anchor node (donor node) 1 to the anchor node (donor node) 2, and the central unit (or the control plane portion of the central unit, or the user plane portion of the central unit) to which the distributed unit portion of the relay node is connected, is changed from the central unit (or the control plane portion of the central unit, or the user plane portion of the central unit) of the anchor node (donor node) 1 to the central unit (or the control plane portion of the central unit, or the user plane portion of the central unit) of the anchor node (donor node) 2; in another example, the relay node migrates from the anchor node (donor node) 1 to the anchor node (donor node) 2; in this example, the mobile terminal portion of the relay node is switched from the anchor node (donor node) 1 to the anchor node (donor node) 2, while the central unit (or the control plane portion of the central unit or the user plane portion of the central unit) to which the distributed unit portion of the relay node is connected, is still the central unit (or the control plane portion of the central unit or the user plane portion of the central unit) of the anchor node (donor node) 1. The examples of configuration update of relay nodes given above only give possible situations, and do not exclude that configuration update of relay nodes according to the above mapping information may also occur in other situations.

A node that receives the mapping information will replace the old information with the new information, and the replacement of the old and new information will affect the transmission of data, which may include different control signaling (such as an F1AP signaling) and/or data belonging to radio bearers of different users; if the mapping information includes "applicable information", only the data indicated by "applicable information" is applicable to the replacement of the old and new information indicated in the mapping information; if the mapping information includes "exception information", the data indicated by "exception information" is not applicable to the replacement of the old and new information indicated in the mapping information. The following are some examples of a configuration update of a relay node using mapping information:

In one example, the above "mapping-related information" provides "new information related to the address on the relay node side" (such as a new IP address) and/or "old information related to the address on the relay node side" (such as an old IP address), and the relay node receiving the information will change the address by which the data is transmitted or received from the one indicated by the "old information related to the address on the relay node side" to the one indicated by the "new information related to the address on the relay node side"

In another example, the above "mapping-related information" provides "new information related to the address on the anchor node (donor node) side" (such as a new IP address) and/or "old information related to the address on the anchor node (donor node) side" (such as an old IP address), and the relay node receiving the information will change the address to which the data is transmitted from the one indicated by the "old information related to the address on the anchor node (donor node) side" to the one indicated by the "new information related to the address on the anchor node (donor node) side", or the relay node may consider that the data from the address indicated by the "old information related to the address on the anchor node (donor node) side" is changed to be from address indicated by the "new information related to the address on the anchor node (donor node) side"

In another example, the above "mapping-related information" provides "new information related to the tunnel of the uplink data" and/or "old information related to the tunnel of the uplink data", and the relay node receiving the information will change the tunnel to which the data is transmitted from the one indicated by the "old information related to the tunnel of the uplink data" to the one indicated by the "new information related to the tunnel of the uplink data"

In another example, the above "mapping-related information" provides "new information related to the tunnel of downlink data" and/or "old information related to the tunnel of downlink data", and the relay node receiving the information will change the tunnel from which the data is received from the one indicated by the "old information related to the tunnel of downlink data" to the one indicated by the "new information related to the tunnel of downlink data"

In another example, the above "mapping-related information" provides "new routing identification information" and/or "old routing identification information", and the relay node receiving the information will change the transmission path to which the data is transmitted from the one indicated by the "old routing identification information" to the one indicated by the "new routing identification information"; further, the information added to the data packet by the relay node is changed from the "old routing identification information" to the "new routing identification information"

In another example, the above "mapping-related information" provides "new identification information of the next hop node" and/or "old identification information of the next hop node", and the relay node receiving the information will change the node to which the data is transmitted from the one indicated by the "old identification information of the next hop node" to the one indicated by the "new identification information of the next hop node"

In another example, the above "mapping-related information" provides "new identification information of the backhaul link channel" and/or "old identification information of the backhaul link channel", and the relay node receiving the information will change the backhaul link channel by which the data is transmitted from the one indicated by the "old identification information of the backhaul link channel" to the one indicated by the "new identification information of the backhaul link channel"

The beneficial effect of transmitting the above-mentioned "mapping-related information" is that the receiving node of the information can update the configuration of data transmission of multiple users served by the relay node simultaneously according to the "mapping-related information", thus the configuration update of data transmission of multiple users can be completed through one signaling, and the configuration of data transmission of each user does not need to be updated separately by using the signaling related to the multiple users. For example, when the IP addresses included in the uplink/downlink tunnel information of radio bearers of multiple users are the same, the IP address can be updated to a new IP address through the "mapping-related information", so that the IP addresses in the uplink/downlink tunnel information of the radio bearers of the multiple users are updated simultaneously; in another example, when routing identifiers of data of radio bearers of multiple users are the same, the routing identifiers can be updated to new routing identifiers through the "mapping-related information", so that the routing identifiers of data of the multiple radio bearers are updated simultaneously; in another example, when next-hop nodes of the data of radio bearers of multiple users are the same, the next-hop nodes can be updated to new next-hop nodes through the "mapping-related information", so that the next-hop nodes of data of the multiple radio bearers are updated simultaneously; in another example, when backhaul link channels used for transmitting data of radio bearers of multiple users are the same, the backhaul link channels can be updated to new backhaul link channels through the "mapping-related information", so that the backhaul link channels carrying data of the multiple radio bearers are updated simultaneously.

Configuration information related to a backhaul link channel of a relay node, the backhaul link channel being a channel served by a mobile terminal portion of the relay node. For a certain backhaul link channel, the information includes at least one of the following information:

Identification information of the backhaul link channel, such as an ID of the backhaul link channel QoS parameter information of the backhaul link channel, see TS38.473

Configuration information for serving the backhaul link channel, such as configuration of a RLC layer, configuration information of a logical channel of the backhaul link channel (such as identification information and priority information of the logical channel of the backhaul link), which may be referred to CellGroup-Configuration Information related to data carried by the backhaul link channel, which may be uplink data (data generated by the relay node and transmitted to the anchor node (donor node), such as data of the user plane of F1 interface generated by the distributed unit portion of the relay node, or data forwarded by the relay node to the anchor node (donor node), such as data received by the relay node from other nodes), or downlink data (data transmitted by the anchor node (donor node) to the relay node, which may be data transmitted to the distributed unit portion of the relay node, or data transmitted to other nodes but required to be forwarded by the relay node), or may include both the uplink data and the downlink data, the information includes at least one of the following information:

Information related to a radio bearer of a user, data of the radio bearer of the user is transmitted through the backhaul link channel. The contents included in this information are referred to the "information related to the radio bearer of the user" in the "configuration information of the user" described above Indication information of a type to which the data belongs; the indicated types may include: a non-UE-associated F1 interface signaling (a non-UE-associated F1AP signaling), a UE-associated F1 interface signaling (a UE-associated F1AP signaling), control signaling types of different priorities (such as control signaling type 1, control signaling type 2, control signaling type 3, . . . , and further control signaling type 1 having the highest priority, control signaling type 2 having the second highest priority), and data of non-F1 interface (non-F1 traffic, such as IPSec protocol data, SCTP protocol data, data from OAM)

Routing ID information for data transmission, which is used for indicating the transmission path of the data and includes address information (a BAP address) of the receiving node and/or a transmission path identification information (a path ID); further, according to the information, the relay node can add the information to the transmitted data packet Identification information of a next-hop node of the data; the next-hop node is a node that directly receives uplink data when the relay node transmits the data, in other words, the relay node transmits the uplink data to the next-hop node, the uplink data is then transmitted by the next-hop node directly or indirectly (through other nodes) to the destination node of the uplink data. According to the information, the relay node knows to which node the uplink data is transmitted Configuration information of aggregated data, which is formed by aggregating data of multiple users or different data of one user; in the transmission process, the aggregated data may be transmitted by the same backhaul link channel; the information includes at least one of the following information:

QoS parameter information of the aggregated data

Configuration information of data included in the aggregated data; the data included in the aggregated data may belong to different radio bearers of different users, and may belong to different radio bearers of the same user; for a radio bearer, the information included in the configuration information may be referred to the "information related to the radio bearer of the user" in the "configuration information of the user" described above Information related to the backhaul link channel used by the mobile terminal portion of the relay node to serve the aggregated data; the information included in the information may be referred to the "configuration information related to the backhaul link channel of the relay node" described above The beneficial effect of transmitting this information is that the receiving node can know how the data are aggregated and transmitted in the relay network, and also assist the receiving node in aggregating the data of different users for transmission.

The first aspect of the present disclosure is a migration process of a relay node, and FIG. 4 is an example of the migration process of the relay node according to an embodiment of the present disclosure. As shown in FIG. 4, the process includes the following steps:

Step 1-1: a second node transmits a first request message to a third node. In one embodiment, the first request message may be a handover request message, which serves to provide the third node with configuration information related to a first node when it is served by the second node, and the information assists the third node in generating a configuration for serving the first node. In one embodiment, the handover request message is a handover request message for a mobile terminal portion of the first node, and the contents included in the handover request message may be referred to the HANDOVER REQUEST message in TS38.423. In addition to the information included in the existing HANDOVER REQUEST message, the handover request message may include at least one of the following information:

First user configuration information, which is the configuration information of one or more users served by the first node before migration; the one or more users may be users accessing the distributed unit portion of the first node; for each user, the contents included in the information may be referred to the above "configuration information of the user", which is configuration information possessed by the first node before migration First backhaul link channel configuration information, which is configuration information related to the backhaul link channel served by a mobile terminal portion of the first node; the information may be referred to the above "configuration information related to the backhaul link channel of the relay node"

First address-related information, which is address-related information required by the first node; information included in this information is related to the address used by the first node before migration, i.e. the first node uses the address-related information to perform data transmission with the second node, and the contents included in this information may be referred to the above "address-related information required by the relay node"

First configuration information of aggregated data, which is configuration information of the aggregated data served by the first node before migration; the contents included in this information may be referred to the above "configuration information of the aggregated data"

Step 1-2: the third node transmits a first response message to the second node. In one embodiment, the first response message may be a handover response message, which serves to provide the second node with the configuration generated by the third node for serving first node; in one embodiment, the handover response message is a handover response message for the mobile terminal portion of the first node, and the contents of the handover response message may be referred to the HANDOVER REQUEST ACKNOWLEDGE message in TS38.423. In addition to the information included in the existing HANDOVER REQUEST ACKNOWLEDGE message, the handover response message includes at least one of the following information:

Second user configuration information, which is the configuration information of one or more users served by the first node (its distributed unit portion) after the migration; the contents included in this information may be referred to the above "configuration information of the user"; in one embodiment, the user is a user accepted by the third node and/or a user not accepted by the third node, after the first node migrates;

Second mapping relation information, which reflects the mapping relation of information used by the first node before and after the migration, is used for updating configuration information used by the first node when performing data transmission. The contents included in this information may be referred to the above "mapping-related information"; the new information in this information is the information required for the first node after the migration, while the old information is the information used for the first node before the migration. The beneficial effect of this information is that it may assist the first node in updating the configuration information required for transmission of the data (e.g. data of different users, an F1AP signaling, etc.) of its distributed unit portion with less signaling, without using multiple different signaling to update the configuration information required for transmission of different data, respectively.

Second backhaul link channel configuration information, which is the configuration information related to the backhaul link channel served by the mobile terminal portion of the first node after the migration; the information may be referred to the above "configuration information related to the backhaul link channel of the relay node"; In one embodiment, the backhaul link channel is the backhaul link channel accepted by the third node after the migration Second address-related information, which is address-related information required by the first node after the migration, is used for data transmission between the first node and the third node; the contents included in this information may be referred to the above "address-related information required by relay nodes"

Step 1-3: the second node transmits a first configuration message to the first node. In one embodiment, the first configuration message may be a migration configuration message, which serves to provide the first node with configuration information required for migration and/or configuration information required after the migration to a third node. In one embodiment, the migration configuration message may be an RRCReconfig message in TS38.331. In addition to the information included in the existing RRCReconfig message, the migration configuration message includes at least one of the following information:

Third user configuration information, which is the configuration information of one or more users served by the first node (its distributed unit portion) after the migration; the contents included in this information may be referred to the above "configuration information of the user"; in one embodiment, the user is a user accepted by the third node and/or a user not accepted by the third node, after the first node migrates Third mapping relation information, which reflects the mapping relation of information used by the first node before and after the migration, is used for updating the configuration information used by the first node when performing data transmission. The contents included in this information may be referred to the above "mapping-related information"; the new information in this information is the information required to be used by the first node after the migration, while the old information is the information used for the first node before the migration. The beneficial effect of this information is that it may assist the first node in updating the configuration information required for transmission of the data (e.g. data of different users, an F1AP signaling, etc.) of its distributed unit portion with less signaling, without using multiple different signaling to update the configuration information required for transmission of different data respectively Third backhaul link channel configuration information, which is the configuration information related to the backhaul link channel served by the mobile terminal portion of the first node after migration; the information may be referred to the above "configuration information related to the backhaul link channel of the relay node"; in one embodiment, the backhaul link channel is the backhaul link channel accepted and/or not accepted by the third node after the migration Third address-related information, which is address-related information required by the first node after migration, is used for data transmission between the first node and the third node. The contents included in this information may be referred to the above "address-related information required by relay nodes"

Optionally, after step 1-3 and before step 1-4, the process of the mobile terminal portion of the first node accessing the third node, such as a cell search, a random access, etc., is also included. Since these processes are not related to the problems to be solved by the present disclosure, they will not be described in detail in the present disclosure.

Step 1-4: the first node transmits a first configuration completion message to the third node. In one embodiment, the first configuration completion message may be a migration configuration completion message, which serves to acknowledge the completion of the migration of the first node to the third node. In one embodiment, the migration configuration completion message may be an RRCReconfigComplete message in TS38.331; in addition to the information included in the existing RRCReconfigComplete message, the migration configuration completion message includes at least one of the following information:

Fourth user configuration information, which is configuration information of the users served by the distributed unit portion of the first node after migration; the contents included in this information may be referred to the above "configuration information of the user"; in one embodiment, the user is a user accepted by the third node and/or a user not accepted by the third node after the first node migrates Fourth mapping relation information, which reflects the mapping relation of information used by the first node before and after the migration, is used for updating configuration information used by the first node side in data transmission The contents included in this information may be referred to the above "mapping-related information"; the new information in this information is the information required to be used by the first node after the migration, while the old information is the information used for the first node before the migration. The information has the beneficial effect that the third node can be assisted to update the configuration information required for transmitting the data of the distributed unit portion of the first node (e.g., data of different users, an F1AP signaling, etc.) with less signaling, without using multiple different signaling to update the configuration information required for transmission of different data respectively.

The above process has different implementations for different migration methods of the relay node in FIG. 3. In the following embodiments, the specific contents of the information included in each message may be referred to the "configuration information of the user", "address-related information required by the relay node", "mapping-related information", "configuration information related to the backhaul link channel of the relay node" described above. The processes involved in the following embodiments are the above steps 1-1 to 1-4. The difference between different embodiments is that the information included in each message can be different. In order to simplify the description of each embodiment and highlight the difference of information included in different implementations, the information included in each message is not completely listed, and those unlisted information may be referred to steps 1-1 to 1-4 above. In addition, when describing embodiments 1-1-2 to 1-3-2, only the differences between the information included in each message and that in embodiment 1-1-1 will be described.

Embodiment 1-1-1 (based on FIG. 3(a), the anchor node (donor node) determines the configuration of the relay node)

Step 1-1: a second node transmits a first request message to a third node. In one embodiment, the first request message may be a handover request message, which may include at least one of the following information:

First user configuration information, which includes at least one of the following information:
An identifier of a user, such as a gNB-CU/DU UE F1AP ID, a C-RNTI, a UE XnAP ID
Information related to a radio bearer of the user, for a radio bearer (such as data radio bearer (DRB), signaling radio bearer (SRB)), the information including at least one of the following information:
An identifier of the user, such as a gNB-CU/DU UE F1AP ID, a C-RNTI, a UE XnAP ID
Identification information of the radio bearer of the user, such as a UE RB ID.
Identification information, such as a DRB ID, a SRB ID
Information related to QoS of the radio bearer
Configuration information for serving the radio bearer of the user
Information related to QoS satisfied by a relay node, i.e. information related to QoS satisfied by the first node
Information related to QoS satisfied by a non-relay node, i.e. information related to QoS satisfied by a node not being the first node
Information related to a tunnel of uplink data, for a tunnel, including at least one of the following information: tunnel identification information, an IP address, a TEID, routing identification information, identification information of a next hop node, identification information of a backhaul link channel, etc.
Information related to a tunnel of downlink data, for a tunnel, including at least one of the following information: tunnel identification information, an IP address, a TEID, information on the configuration value of a DSCP field, and information on the configuration value of a flow label field
Information related to data forwarding, which may be for uplink data and/or downlink data; the information may include "suggestion on whether data forwarding is required"

Step 1-2: a third node transmits a first response message to a second node. In one embodiment, the first response message may be a handover response message, which includes at least one of the following information:

Second user configuration information, including at least one of the following information:
An identifier of a user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID
Information related to a radio bearer of the user, for a radio bearer (e.g. data radio bearer (DRB), signaling radio bearer (SRB)); in one embodiment, the radio bearer may be a radio bearer accepted by the third node or a radio bearer not be accepted by the third node; the information includes at least one of the following information:
An identifier of a user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID
Identification information of the radio bearer of the user, such as a UE RB ID.
Identification information, such as a DRB ID, a SRB ID
Configuration information for serving the radio bearer of the user; in one embodiment, the configuration information is configuration information generated by the third node
Information related to a tunnel of uplink data, for a tunnel, the information includes at least one of the following information: tunnel identification information, an IP address, a TEID, routing identification information, identification information of a next hop node, identification information of a backhaul link channel, etc.; in one embodiment, the information is information updated by the third node, which is different from the information in step 1-1 described above
Information related to a tunnel of downlink data, for a tunnel, including at least one of the following information: tunnel identification information, an IP address, a TEID, information on the configuration value of a DSCP field, and information on the configuration value of flow label field; in one embodiment, the information is information updated by the third node, which is different from the information in step 1-1 described above Information related to data forwarding, which may be for uplink data and/or downlink data; the information may include an IP address (an address on the third node side) and/or a TEID (a TEID on the third node side)

Second mapping relation information, which reflects the mapping relation of information used by the first node before and after the migration, is used for updating configuration information used by the first node when performing data transmission. The contents included in this information may be referred to the above "mapping-related information"; specifically, the information includes at least one of the following information:

Mapping information of an address, for a mapping of an address, the information includes at least one of the following information:

Identification information of an address on a relay node side

New information related to an address on the relay node side

Old information related to an address on the relay node side

Identification information of an address on an anchor node (donor node) side

New information related to an address on the anchor node (donor node) side

Old information related to an address on the anchor node (donor node) side

Mapping information of a tunnel, for a mapping of a tunnel, the information includes at least one of the following information:

Identification information of a tunnel of uplink data

New information related to the tunnel of the uplink data

Old information related to the tunnel of the uplink data

Identification information of a tunnel of downlink data

New information related to the tunnel of the downlink data

Old information related to the tunnel of the downlink data

Mapping information of a transport network layer association, including at least one of the following information:

Identification information of a transport network layer association on an anchor node (donor node) side New information of the transport network layer association on the anchor node (donor node) side Old information of the transport network layer association on the anchor node (donor node) side Identification information of a transport network layer association on a relay node side New information of the transport network layer association on the relay node side Old information of the transport network layer association on the relay node side Mapping information for non-user plane data transmission Mapping information of a routing identifier, for a mapping of a routing identifier, including at least one of the following information:

New routing identification information

Old routing identification information

The mapping information of a next-hop node, for a mapping of a next-hop node, including at least one of the following information:

New identification information of the next hop node

Old identification information of the next hop node

Mapping information of a backhaul link channel, for a mapping of a backhaul link channel, the information including at least one of the following information:

New identification information of the backhaul link channel

Old identification information of the backhaul link channel

Applicable information

Exception information

The handover response message may include only one of the "second user configuration information" and the "second mapping relation information"; if only the "second user configuration information" is included, the third node respectively provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to the first node. In one embodiment, the first configuration message may be a migration configuration message, which includes at least one of the following information:

Third user configuration information, which includes at least one of the following information:

An identifier of a user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID Information related to a radio bearer of the user, for a radio bearer (e.g. data radio bearer (DRB), signaling radio bearer (SRB)); in one embodiment, the radio bearer may be a radio bearer accepted by the third node or a radio bearer not be accepted by the third node; the information includes at least one of the following information:

An identifier of a user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID Identification information of the radio bearer of the user, such as a UE RB ID.

Identification information, such as a DRB ID, a SRB ID

Configuration information for serving the radio bearer of the user

Information related to a tunnel of uplink data, for a tunnel, including at least one of the following information: tunnel identification information, an IP address, a TEID, routing identification information, identification information of a next hop node, identification information of a backhaul link channel, etc.; in one embodiment, the information is information updated by the third node, which is different from the information in step 1-1 described above Information related to a tunnel of downlink data, for a tunnel, including at least one of the following information: tunnel identification information, an IP address, a TEID, etc.; in one embodiment, the information is information updated by the third node, which is different from the information in step 1-1 described above Third mapping relation information, which reflects the mapping relation of information used by the first node before and after the migration, is used for updating the configuration information used by the first node when performing data transmission. The contents included in this information may be referred to the above "mapping-related information"; specifically, the information includes at least one of the following information:

Mapping information of an address, for a mapping of an address, the information including at least one of the following information:

Identification information of an address on a relay node side

New information related to an address on the relay node side

Old information related to an address on the relay node side

Identification information of an address on an anchor node (donor node) side

New information related to an address on the anchor node (donor node) side

Old information related to an address on the anchor node (donor node) side

Mapping information of a tunnel, for a mapping of a tunnel, the information including at least one of the following information:

Identification information of a tunnel of uplink data

New information related to the tunnel of the uplink data

Old information related to the tunnel of the uplink data

Identification information of a tunnel of downlink data

New information related to the tunnel of the downlink data

Old information related to the tunnel of the downlink data

Mapping information of a transport network layer association, including at least one of the following information:

Identification information of a transport network layer association on an anchor node (donor node) side New information of the transport network layer association on the anchor node (donor node) side Old information of the transport network layer association on the anchor node (donor node) side Identification information of a transport network layer association on a relay node side New information of the transport network layer association on the relay node side Old information of the transport network layer association on the relay node side Mapping information for non-user plane data transmission Mapping information of a routing identifier, for a mapping of a routing identifier, including at least one of the following information:

New routing identification information

Old routing identification information

The mapping information of a next-hop node, for a mapping of a next-hop node, including at least one of the following information:

New identification information of the next hop node

Old identification information of the next hop node

Mapping information of a backhaul link channel, for a mapping of a backhaul link channel, the information including at least one of the following information:

New identification information of the backhaul link channel

Old identification information of the backhaul link channel

Applicable information

Exception information

The migration configuration message may include only one of the "third user configuration information" and the "third mapping relation information"; if only the "third user configuration information" is included, the second node provides the first node with updated configuration information for each user respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which serves to acknowledge to the third node the completion of the migration of the first node.

Embodiment 1-1-2 (based on FIG. 3(*a*), the anchor node (donor node) and the relay node respectively determines the configuration of the relay node)

Step 1-1: a second node transmits a first request message to a third node. In one embodiment, the first request message may be a handover request message, and the information included in the handover request message may be referred to step 1-1 in embodiment 1-1-1 mentioned above Step 1-2: the third node transmits a first response message to the second node. In one embodiment, the first response message may be a handover response message, which includes at least one of the following information:

Second user configuration information; the information may not include the "information related to the tunnel of the downlink data" for a user radio bearer, and other information included in the information may be referred to step 1-2 of embodiment 1-1-1 described above Second mapping relation information; the information may not include the "new information related to the address on the relay node side" and/or the "old information related to the address on the relay node side", and/or the "new information related to the tunnel of the downlink data" and/or the "old information related to the tunnel of the downlink data"; other information may be referred to step 1-2 of embodiment 1-1-1 described above The above handover response message may include only one of the "second user configuration information" and the "second mapping relation information"; if only the "second user configuration information" is included, the third node respectively provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to a first node. In one embodiment, the first configuration message may be a migration configuration message, which includes at least one of the following information:

Third user configuration information; the information may not include the "information related to the tunnel of the downlink data" for a user radio bearer, and other information included in the information may be referred to step 1-3 of embodiment 1-1-1 described above Third mapping relation information; the information may not include the "new information related to the address on the relay node side" and/or the "old information related to the address on the relay node side", and/or the "new information related to the tunnel of the downlink data" and/or the "old information related to the tunnel of the downlink data"; other information may be referred to step 1-3 of embodiment 1-1-1 described above The above migration configuration message may include only one of the "third user configuration information" and the "third mapping relation information"; if only the "third user configuration information" is included, the second node provides the first node with updated configuration information for each user respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which is used for acknowledgement to the third node of the completion of migration of the first node; in addition, the message also includes at least one of the following information:

Fourth user configuration information, which includes at least one of the following information:
An identifier of a user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID Information related to a radio bearer of the user, for a radio bearer (e.g. data radio bearer (DRB), signaling radio bearer (SRB)); in one embodiment, the radio bearer may be a radio bearer accepted by the third node and/or a radio bearer not be accepted by the third node; the information includes at least one of the following information:
An identifier of the user, the identification information is identification information used after the first node migrates to the third node, such as a new gNB-CU/DU UE F1AP ID, a new C-RNTI, a new UE XnAP ID; further, it may also include identification information used before the first node migrates, such as an old gNB-CU/DU UE F1AP ID, an old C-RNTI, an old UE XnAP ID Identification information of the radio bearer of the user, such as a UE RB ID.
Identification information, such as a DRB ID, a SRB ID
Information related to a tunnel of downlink data, for a tunnel, including at least one of the following information: tunnel identification information, an IP address, a TEID; in one embodiment, the information is information updated by the first node, which is different from the information in step 1-1 described above Fourth mapping relation information, which includes at least one of the following information:
Mapping information of an address, for a mapping of an address, the information includes at least one of the following information:
Identification information of an address on a relay node side
New information related to an address on the relay node side
Old information related to an address on the relay node side
Mapping information of a tunnel, for a mapping of a tunnel, the information including at least one of the following information:
Identification information of a tunnel of downlink data
New information related to the tunnel of the downlink data
Old information related to the tunnel of the downlink data
Applicable information
Exception information The above migration configuration completion message may include only one of the "fourth user configuration information" and the "fourth mapping relation information"; if only the "fourth user configuration information" is included, the first node provides the third node with updated configuration information for each user respectively; if only the "fourth mapping relation information" is included, the third node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Embodiment 1-2-1 (based on FIG. 3(*b*), the anchor node (donor node) determines the configuration of the relay node)

Step 1-1: a second node transmits a first request message to a third node. In one embodiment, the first request message may be a handover request message, and the information included in the handover request message may be referred to step 1-1 in embodiment 1-1-1 described above;

Step 1-2: the third node transmits a first response message to the second node. In one embodiment, the first response message may be a handover response message, which includes at least one of the following information:
Second user configuration information; for a radio bearer, the information may not include the "configuration information for serving the radio bearer of the user" and/or the "information related to data forwarding", and other information included in the information may be referred to step 1-2 of embodiment 1-1-1 described above
Second mapping relation information, which may be referred to step 1-2 of embodiment 1-1-1 described above The above handover response message may include only one of the "second user configuration information" and the "second mapping relation information"; if only the "second user configuration information" is included, the third node respectively provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to a first node. In one embodiment, the first configuration message may be a migration configuration message, which includes at least one of the following information:

- Third user configuration information; for a radio bearer, the information may not include the "configuration information for serving the radio bearer of the user", and other information included in the information may be referred to step 1-3 of embodiment 1-1-1
- Third mapping relation information; the information included in this information may be referred to step 1-3 of embodiment 1-1-1

The above migration configuration message may include only one of the "third user configuration information" and the "third mapping relation information"; if only the "third user configuration information" is included, the second node provides the first node with updated configuration information for each user respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which serves to acknowledge to the third node the completion of the migration of the first node.

Embodiment 1-2-2 (based on FIG. 3(*b*), the anchor node (donor node) and the relay node respectively determines the configuration of the relay node)

Step 1-1: a second node transmits a first request message to a third node. In one embodiment, the first request message may be a handover request message, and the information included in the handover request message may be referred to step 1-1 in embodiment 1-1-1 described above;

Step 1-2: the third node transmits a first response message to the second node. In one embodiment, the first response message may be a handover response message, which includes at least one of the following information:

- Second user configuration information; for a radio bearer of a user, the information may not include the "configuration information for serving the radio bearer of the user" and/or the "information related to data forwarding"; for the "information related to the tunnel of the downlink data", it may include at least one of the following information: tunnel identification information, an IP address, a TEID, information on the configuration value of a DSCP field, information on the configuration value of a flow label field; in one embodiment, the information on the configuration value of the DSCP field and the information on the configuration value of the flow label field are information after update by the third node, which may be different from the information in step 1-1 described above, while other information is information received in step 1-1. Other information included in the "second user configuration information" may be referred to step 1-2 of embodiment 1-1-1 described above
- Second mapping relation information; the information may not include the "new information related to the address on the relay node side" and/or the "old information related to the address on the relay node side", and/or the "new information related to the tunnel of the downlink data" and/or the "old information related to the tunnel of the downlink data"; other information may be referred to step 1-2 of embodiment 1-1-1 described above The above handover response message may include only one of the "second user configuration information" and the "second mapping relation information"; if only the "second user configuration information" is included, the third node respectively provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to a first node. In one embodiment, the first configuration message may be a migration configuration message, which includes at least one of the following information:

- Third user configuration information; for a radio bearer of a user, the information may not include the "configuration information for serving the radio bearer of the user" and/or the "information related to the tunnel of the downlink data"; other information included in this information may be referred to step 1-3 of embodiment 1-1-1 described above
- Third mapping relation information; the information may not include the "new information related to the address on the relay node side" and/or the "old information related to the address on the relay node side", and/or the "new information related to the tunnel of the downlink data" and/or the "old information related to the tunnel of the downlink data"; other information may be referred to step 1-3 of embodiment 1-1-1 described above The above migration configuration message may include only one of the "third user configuration information" and the "third mapping relation information"; if only the "third user configuration information" is included, the second node provides the first node with updated configuration information for each user respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which is used for confirming to the third node the completion of migration of the first node; in addition, the message also includes at least one of the following information:

Fourth user configuration information; the information included in this information may be referred to step 1-4 in embodiment 1-1-2 described above Fourth mapping relation information; the information included in this information may be referred to step 1-4 in embodiment 1-1-2 described above The above migration configuration completion message may include only one of the "fourth user configuration information" and the "fourth mapping relation information"; if only the "fourth user configuration information" is included, the first node provides the third node with updated configuration information for each user respectively; if only the "fourth mapping relation information" is included, the third node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Embodiment 1-3-1 (based on FIG. 3(*c*), the anchor node (donor node) determines the configuration of the relay node)

Step 1-1: a second node transmits a first request message to a third node. In one embodiment, the first request message may be a handover request message, and the information included in the information may be referred to step 1-1 in embodiment 1-1-1 described above Step 1-2: the third node transmits a first response message to the second node. In one embodiment, the first response message may be a handover response message, which includes at least one of the following information:

Second user configuration information; for a radio bearer of a user, the information may not include the "configuration information for serving the radio bearer of the user"; in one embodiment, for the "information related to the tunnel of the uplink data", the tunnel identification information and/or the IP address and/or the TEID included in the information may be the same as in step 1-1, and the routing identification information and/or the identification information of the next hop node and/or the identification information of the backhaul link channel included in the information may be updated by the third node; in one embodiment, for the "information related to the tunnel of downlink data", the information included in the information may be updated by the third node; in another embodiment, the information may not include the information on the configuration value of the DSCP field and/or the information on the configuration value of the flow label field; in addition, for a radio bearer of a user, the information may also include the "first tunnel information" and/or the "second tunnel information"; the effect of receiving the "first tunnel information" is that the second node will first transmit the data, which is to be transmitted to the first node, to the third node according to the "first tunnel information", and then the third node will transmit the data to the first node, and further, the third node will update the information (such as the IP address, the TEID, etc.) in the data packet; the effect of receiving the "second tunnel information" is that the first node will first transmit the data, which is to be transmitted to the second node, to the third node according to the "second tunnel information", and then the third node will transmit the data to the second node, and further, the third node will update the information (such as the IP address, the TEID, etc.) in the data packet. Other information included in the "second user configuration information" may be referred to step 1-2 in embodiment 1-1-1 described above Second mapping relation information, which may be referred to step 1-2 of embodiment 1-1-1 described above The above handover response message may include only one of the "second user configuration information" and the "second mapping relation information"; if only the "second user configuration information" is included, the third node respectively provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to a first node. In one embodiment, the first configuration message may be a migration configuration message, which includes at least one of the following information:

Third user configuration information; for a radio bearer, the information may not include the "configuration information for serving the radio bearer of the user"; for the "information related to the tunnel of the uplink data", its IP address and/or TEID are updated according to the "second tunnel information" received in step 1-2 above, while the routing identification information and/or the identification information of the next hop node and/or the identification information of the backhaul link channel are updated according to the "information related to the tunnel of the uplink data" received in step 1-2; the "information related to the tunnel of the downlink data" includes the tunnel identification information and/or the IP address and/or the TEID included in step 1-2 described above; other information included in the "third user configuration information" may be referred to step 1-3 in embodiment 1-1-1 described above Third mapping relation information; the information included in this information may be referred to step 1-3 of embodiment 1-1-1

The above migration configuration message may include only one of the "third user configuration information" and the "third mapping relation information"; if only the "third user configuration information" is included, the second node provides the first node with updated configuration information for each user respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which serves to confirm to the third node the completion of the migration of the first node.

Embodiment 1-3-2 (based on FIG. 3(*c*), the anchor node (donor node) and the relay node, respectively, determines the configuration of the relay node)

Step 1-1: a second node transmits a first request message to a third node. In one embodiment, the first request message may be a handover request message, and the information included in the information may be referred to step 1-1 in embodiment 1-1-1 described above;

Step 1-2: the third node transmits a first response message to the second node. In one embodiment, the first response message may be a handover response message, which includes at least one of the following information:

Second user configuration information; for a radio bearer of a user, the information may not include the "configuration information for serving the radio bearer of the user", and/or the "information related to the tunnel of the downlink data"; in one embodiment, for the "information related to the tunnel of the uplink data", the tunnel identification information and/or the IP address and/or the TEID included in the information may be the same as in step 1-1, and the routing identification information and/or the identification information of the next hop node and/or the identification information of the backhaul link channel included in the information may be updated by the third node; in addition, for a radio bearer of a user, the information may also include the "first tunnel information" and/or the "second tunnel information"; the effect of receiving the "first tunnel information" is that the second node will first transmit the data, which is to be transmitted to the first node, to the third node according to the "first tunnel information", and then the third node will transmit the data to the first node, and further, the third node will update the information (such as the IP address, the TEID, etc.) in the data packet. The effect of receiving the "second tunnel information" is that the first node will first transmit the data, which is to be transmitted to the second node, to the third node according to the "second tunnel information", and then the third node will transmit the data to the second node, and further, the third node will update the information (such as the IP address, the TEID, etc.) in the data packet. Other information included in the "second user configuration information" may be referred to step 1-2 in embodiment 1-1-1 described above Second mapping relation information; the information may not include the "new information related to the address on the relay node side" and/or the "old information related to the address on the relay node side", and/or the "new information related to the tunnel of the downlink data" and/or the "old information related to the tunnel of the downlink data"; the information may be referred to step 1-2 of embodiment 1-1-1 described above The above handover response message may include only one of the "second user configuration information" and the "second mapping relation information"; if only the "second user configuration information" is included, the third node, respectively, provides updated configuration information for each user; if only the "second mapping relation information" is included, the second node can update multiple configurations simultaneously (e.g., simultaneously updating the configurations of data transmission for different users, or simultaneously updating the configurations of signaling transmission, or simultaneously updating the configurations of data transmission and signaling transmission for different users) with this information, thereby signaling overhead can be saved.

Step 1-3: the second node transmits a first configuration message to a first node. In one embodiment, the first configuration message may be a migration configuration message, which includes at least one of the following information:

Third user configuration information; for a radio bearer, the information may not include the "configuration information for serving the radio bearer of the user", and/or the "information related to the tunnel of the downlink data"; for the "information related to the tunnel of the uplink data", its IP address and/or TEID are updated according to the "second tunnel information" received in step 1-2 above, while the routing identification information and/or the identification information of the next hop node and/or the identification information of the backhaul link channel are updated according to the "information related to the tunnel of the uplink data" received in step 1-2; other information included in the "third user configuration information" may be referred to step 1-3 in embodiment 1-1-1 described above Third mapping relation information; the information may not include the "new information related to the address on the relay node side" and/or the "old information related to the address on the relay node side", and/or the "new information related to the tunnel of the downlink data", and/or the "old information related to the tunnel of the downlink data"; the information contained in the information may be referred to step 1-3 of embodiment 1-1-1

The above migration configuration message may include only one of the "third user configuration information" and the "third mapping relation information"; if only the "third user configuration information" is included, the second node provides the first node with updated configuration information for each user, respectively; if only the "third mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 1-4: the first node transmits a first configuration completion message to the third node. In one embodiment, the first configuration completion message may be a migration configuration completion message, which serves to confirm to the third node the completion of the migration of the first node.

Fourth user configuration information; the information included in this information may be referred to step 1-4 in embodiment 1-1-2 described above Fourth mapping relation information; the information included in this information may be referred to step 1-4 in embodiment 1-1-2 described above The above migration configuration completion message may include only one of the "fourth user configuration information" and the "fourth mapping relation information"; if only the "fourth user configuration information" is included, the first node provides the third node with updated configuration information for each user, respectively; if only the "fourth mapping relation information" is included, the third node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

In the above processes, the handover request message and the handover response message can respectively use the existing HANDOVER REQUEST message and HANDOVER REQUEST ACKNOWLEDGE message of the Xn interface to transmit relevant information. Other existing messages or new messages (e.g., an IAB node handover (migration) request and an IAB node handover (migration) request acknowledgement) messages) may also be used, and other messages may be possible.

The migration configuration message and the migration configuration completion message can, respectively, use the existing RRCReconfig message and RRCReconfigComplete to transmit relevant information, and can also use other existing messages or new messages.

In the above processes, steps 1-1 and 1-2 can be executed as a separate process, and steps 1-3 and 1-4 can be executed as a separate process.

Possible beneficial effects of the above processes include:
1. Completing migration of a relay node between different anchor nodes (donor nodes), such as handover of a mobile terminal portion of the relay node between the different anchor nodes (donor nodes), and migration of users served by a distributed unit portion of the relay node between the different anchor nodes (donor nodes). The handover of each user needs to perform the handover process separately in the traditional technology, while the above processes can complete the handover of multiple users simultaneously, which is different from the traditional technology;
2. In migration process of the relay node, the configuration information of the data to be transmitted by the distributed unit portion of the relay node needs to be updated. According to the above processes, signaling required for updating the configuration information can be effectively reduced. For example, the information related to mapping interacted in the above processes may assist the receiving node in updating multiple configurations simultaneously (for example, updating the configurations of data transmission for different users simultaneously, or updating the configurations of signaling transmission simultaneously, or updating the configurations of data transmission and signaling transmission for different users simultaneously), thereby signaling overhead is saved;
3. The connection between the distributed unit portion of the relay node and the central unit of the source anchor node (donor node) is maintained, the configuration update for users accessing the relay node is reduced, and thereby signaling overhead is saved.

The second aspect of the present disclosure is a configuration update process of a relay node, and FIG. 5 is an example of a configuration update process of a relay node according to an embodiment of the present disclosure.

As shown in FIG. 5, the process includes the following steps:

Step 2-1: A fourth node transmits a first configuration request message to a first node; the message is mainly used for updating the configuration of the first node, and the first configuration request message may include at least one of the following information:

Fifth address-related information, which is address-related information provided by the fourth node to the first node. This information is used for data transmission between the first node and the fourth node; the contents included in this information may be referred to the "address-related information required by the relay node" described above Fifth user configuration information, the contents in this information may be referred to the "configuration information of the user" described above; in addition, for a user, optionally, the information may also include at least one of the following information:

Identification information of the user before the configuration is updated, such as an old gNB-CU UE F1AP ID and/or an old gNB-DU UE F1AP ID Identification information of the user after the configuration is updated, such as a new gNB-CU UE F1AP ID, and/or a new gNB-DU UE F1AP ID Fifth mapping relation information, which reflects the mapping relation of information used before and after the configuration of the first node is updated, the information being used for updating the configuration information used by the first node for data transmission. The contents included in this information may be referred to the "mapping-related information" described above. The new information in this information is the information required to be used by the first node after the configuration is updated, while the old information is information used by the first node before the configuration is updated. The beneficial effect of this information is that it may assist the first node in updating the configuration information, which is required by its distributed unit portion for transmission of the data (e.g. data of different users, an F1AP signaling, etc.), with less signaling, instead of using multiple different signaling to update the configuration information required for transmission of different data, respectively.

The above first configuration request message may include only one of the "fifth user configuration information" and the "fifth mapping relation information"; if only the "fifth user configuration information" is included, the fourth node provides the updated configuration information for each user of the first node, respectively; if only the "fifth mapping relation information" is included, the first node can update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead can be saved.

Step 2-2: optionally, the first node transmits a first configuration response message to the fourth node, and the first configuration response message is mainly used for acknowledgement of the first configuration request message described above. Further, the message can also be used for informing of the update of configuration information made by the first node, and the message includes at least one of the following information:

Sixth user configuration information, the contents included in this information may be referred to the above "configuration information of the user"; in addition, for a user, the information can further optionally include at least one of the following information:

Identification information of the user before the configuration is updated, such as an old gNB-CU UE F1AP ID and/or an old gNB-DU UE F1AP ID Identification information of the user after the configuration is updated, such as a new gNB-CU UE F1AP ID, and/or a new gNB-DU UE F1AP ID Sixth mapping relation information, which reflects the mapping relation of information used before and after the configuration of the first node is updated. The information is used for updating the configuration information used by the first node for data transmission. The contents included in this information may be referred to the "mapping-related information" described above. The new information in this information is information required to be used by the first node after the configuration is updated, while the old information is information used by the first node before the configuration is updated. The beneficial effect of this information is that it may assist the first node in updating the configuration information, which is required by its distributed unit portion for transmission of the data (e.g. data of different users, an F1AP signaling, etc.), with less signaling, instead of using multiple different signaling to update the configuration information required for transmission of different data, respectively.

The above first configuration response message may include only one of the "sixth user configuration information" and the "sixth mapping relation information"; if only the "sixth user configuration information" is included, the first node provides each user with updated configuration information respectively; if only the "sixth mapping relation information" is included, the fourth node may update multiple configurations simultaneously (such as updating the configurations of data transmission for different users simultaneously, or updating the configurations of signaling transmission simultaneously, or updating the configurations of data transmission and signaling transmission for different users simultaneously) with this information, thereby signaling overhead is saved.

The above process may have different embodiments. In the following embodiments, the specific contents of the information included in each message may be referred to the "configuration information of the user", "address-related information required by the relay node", "mapping-related information", "configuration information related to the backhaul link channel of the relay node" described above. The processes involved in the following embodiments are the steps 2-1 to 2-2 described above. The difference between different embodiments is that the information included in each message can be different. In order to simplify the description of each embodiment and highlight the difference of information included in different implementations, the information included in each message is not completely listed, and those unlisted information may be referred to the description in steps 2-1 to 2-2 above.

Embodiment 2-1 (update configuration is fully determined by an anchor node (donor node))

Step 2-1: A fourth node transmits a first configuration request message to a first node; the message is mainly used for updating the configuration of the first node, and the first configuration request message may include at least one of the following information:

Fifth user configuration information, which includes at least one of the following information:

Identification information of the user before the configuration is updated, such as an old gNB-CU UE F1AP ID and/or an old gNB-DU UE F1AP ID Identification information of the user after the configuration is updated, such as a new gNB-CU UE F1AP ID, and/or a new gNB-DU UE F1AP ID Information related to a radio bearer of the user, for a radio bearer (such as data radio bearer (DRB), signaling radio bearer (SRB)), the information including at least one of the following information:

Identification information of the user before the configuration is updated, such as an old gNB-CU UE F1AP ID and/or an old gNB-DU UE F1AP ID Identification information of the user after the configuration is updated, such as a new gNB-CU UE F1AP ID, and/or a new gNB-DU UE F1AP ID Identification information of the radio bearer of the user, such as a UE RB ID.

Identification information, such as a DRB ID, a SRB ID

Information related to a tunnel of uplink data, for a tunnel, including at least one of the following information: tunnel identification information, an IP address, a TEID, routing identification information, identification information of a next hop node, identification information of a backhaul link channel, etc.

Information related to a tunnel of downlink data, for a tunnel, including at least one of the following information: tunnel identification information, an IP address, a TEID Fifth mapping relation information, including at least one of the following information:

Mapping information of an address, for a mapping of an address, the information including at least one of the following information:

Identification information of an address on a relay node side

New information related to an address on the relay node side

Old information related to an address on the relay node side

Identification information of an address on an anchor node (donor node) side

New information related to an address on the anchor node (donor node) side

Old information related to an address on the anchor node (donor node) side

Mapping information of a tunnel, for a mapping of a tunnel, the information including at least one of the following information:

Identification information of a tunnel of uplink data

New information related to the tunnel of the uplink data

Old information related to the tunnel of the uplink data

Identification information of a tunnel of downlink data

New information related to the tunnel of the downlink data

Old information related to the tunnel of the downlink data

Mapping information of a transport network layer association, for a transport network layer association, including at least one of the following information:

Identification information of a transport network layer association on an anchor node (donor node) side New information of the transport network layer association on the anchor node (donor node) side Old information of the transport network layer association on the anchor node (donor node) side Identification information of a transport network layer association on a relay node side New information of the transport network layer association on the relay node side
Old information of the transport network layer association on the relay node side
Mapping information for non-user plane data transmission
Mapping information of a routing identifier, for a mapping of a routing identifier, including at least one of the following information:
New routing identification information
Old routing identification information
The mapping information of a next-hop node, for a mapping of a next-hop node, including at least one of the following information:
New identification information of the next hop node
Old identification information of the next hop node
Mapping information of a backhaul link channel, for a mapping of a backhaul link channel, the information including at least one of the following information:
New identification information of the backhaul link channel
Old identification information of the backhaul link channel
Applicable information
Exception information Step 2-2: optionally, the first node transmits a first configuration response message to the fourth node, and the message is mainly used for acknowledgement of the above first configuration request message.

Embodiment 2-2 (update configuration is determined by an anchor node (donor node) and a relay node respectively)

Step 2-1: a fourth node transmits a first configuration request message to a first node; the message is mainly used for updating the configuration of the first node, and the first configuration request message may include at least one of the following information:

Fifth user configuration information; for a user radio bearer, the information may not include the "information related to the tunnel of the downlink data"; other information may be referred to step 2-1 in embodiment 2-1 described above
Fifth mapping relation information; the information may not include the "information related to the address on the new relay node side", and/or the "old information related to the address on the relay node side", and/or the "new information related to the tunnel of the downlink data", and/or the "old information related to the tunnel of the downlink data", and/or the "new information of the transmission network layer association on the relay node side", and/or the "old information of the transmission network layer association on the relay node side"; other information may be referred to step 2-1 of embodiment 2-1 described above Step 2-2: optionally, the first node transmits a first configuration response message to the fourth node, and the first configuration response message is mainly used for acknowledgement of the first configuration request message described above. Further, the message can also be used for informing of the update of configuration information made by the first node, and the message includes at least one of the following information:

Sixth user configuration information, including at least one of the following information:
Identification information of the user before the configuration is updated, such as an old gNB-CU UE F1AP ID and/or an old gNB-DU UE F1AP ID
Identification information of the user after the configuration is updated, such as a new gNB-CU UE F1AP ID, and/or a new gNB-DU UE F1AP ID
Information related to a radio bearer of the user, for a radio bearer (such as data radio bearer (DRB), signaling radio bearer (SRB)), the information including at least one of the following information:
Identification information of the user before the configuration is updated, such as an old gNB-CU UE F1AP ID and/or an old gNB-DU UE F1AP ID
Identification information of the user after the configuration is updated, such as a new gNB-CU UE F1AP ID, and/or a new gNB-DU UE F1AP ID
Identification information of the radio bearer of the user, such as a UE RB ID
Identification information, such as a DRB ID, a SRB ID
Information related to a tunnel of downlink data, for a tunnel, including at least one of the following information: tunnel identification information, an IP address, a TEID
Sixth mapping relation information, including at least one of the following information:
Mapping information of an address, for a mapping of an address, the information including at least one of the following information:
Identification information of an address on a relay node side
New information related to an address on the relay node side
Old information related to an address on the relay node side
Mapping information of a tunnel, for a mapping of a tunnel, the information including at least one of the following information:
Identification information of a tunnel of downlink data
New information related to the tunnel of the downlink data
Old information related to the tunnel of the downlink data
Mapping information of a transport network layer association, for a transport network layer association, the information includes at least one of the following information:
Identification information of a transport network layer association on a relay node side
New information of the transport network layer association on the relay node side
Old information of the transport network layer association on the relay node side
Applicable information
Exception information In one implementation, one implementation of the above signaling is:

Step 2-1: a fourth node transmits a first configuration request message to a first node; the message is mainly used for updating the configuration of the first node, and the first configuration request message may include at least one of the following information:

Information related to uplink tunnels, including information related to one or more uplink tunnels, and for an uplink tunnel, the information includes at least one of the following information:
Identification information of a tunnel of uplink data
Old information related to the tunnel of the uplink data, such as an IP address, and/or a TEID
New information related to the tunnel of the uplink data, such as an IP address, and/or a TEID
Routing identification information Identification information of a next hop node
Identification information of a backhaul link channel
Information of a transport network layer association on an anchor node (donor node) side, including one or more transport network layer associations on the anchor node (donor node) side, and for a transport network layer association on an anchor node (donor node) side, the information includes at least one of the following information:
Identification information of the transport network layer association on the anchor node (donor node) side
IP address information
Port information
New indication information of a use of the transport network layer association on the anchor node (donor node) side
Mapping information of a next-hop node, including one or more such mapping information; for a mapping of a next-hop node, the information includes at least one of the following information:
New identification information of the next hop node
Old identification information of the next hop node Step 2-2: optionally, the first node transmits a first configuration response message to the fourth node, and the message includes at least one of the following information:
Information related to a downlink tunnel, including information related to one or more downlink tunnels; for a downlink tunnel, the information includes at least one of the following information:
Identification information of a tunnel of downlink data
Old information related to the tunnel of the downlink data, such as an IP address, and/or a TEID
New information related to the tunnel of the downlink data, such as an IP address, and/or a TEID
Mapping information of an address, including mapping information of one or more addresses; for an address, the information includes at least one of the following information:
Identification information of an address on a relay node side
New information related to the address on the relay node side, such as an IP address
Old information related to the address on the relay node side, such as an IP address
Information of a transmission network layer association on the relay node side, including one or more transmission network layer associations on the relay node side; for a transmission network layer association on the relay node side, the information includes at least one of the following information:
Identification information of a transport network layer association on a relay node side
IP address information
Port information
Indication information of a use of a transport network layer association on the relay node side In one implementation, another implementation of the above signaling is:

Step 2-1: a fourth node transmits a first configuration request message to a first node, and the message is mainly used for updating the configuration of the first node, and the configuration update is performed for one or more users or for one or more radio bearers of the users; for a user or a radio bearer of the user, the first configuration request message may include at least one of the following information:
Identification information of the user
Identification information of the radio bearer of the user, such as a DRB ID.
Information related to an uplink tunnel, including information related to one or more uplink tunnels of a user or a radio bearer of the user; for an uplink tunnel, the information includes at least one of the following information:
Identification information of a tunnel of uplink data
Old information related to the tunnel of the uplink data, such as an IP address, and/or a TEID
New information related to the tunnel of the uplink data, such as an IP address, and/or a TEID
Routing identification information
Identification information of a next hop node
Identification information of a backhaul link channel
Information of a transport network layer association on an anchor node (donor node) side, including one or more transport network layer associations on the anchor node (donor node) side, and for a transport network layer association on an anchor node (donor node) side, the information includes at least one of the following information:
Identification information of the transport network layer association on the anchor node (donor node) side
IP address information
Port information
New indication information of a use of the transport network layer association on the anchor node (donor node) side
Mapping information of a next-hop node, including one or more such mapping information; for a mapping of a next-hop node, the information includes at least one of the following information:
New identification information of the next hop node
Old identification information of the next hop node Step 2-2: optionally, the first node transmits a first configuration response message to the fourth node, and the configuration update is performed for one or more users or for one or more radio bearers of users; for a user or a radio bearer of the user, the message includes at least one of the following information:
Identification information of the user
Identification information of the radio bearer of the user, such as a DRB ID.
Information related to a downlink tunnel, including information related to one or more downlinks; for a downlink tunnel, the information includes at least one of the following information:
Identification information of a tunnel of downlink data
Old information related to the tunnel of the downlink data, such as an IP address, and/or a TEID
New information related to the tunnel of the downlink data, such as an IP address, and/or a TEID
Mapping information of an address, including mapping information of one or more addresses; for an address, the information includes at least one of the following information:
Identification information of an address on a relay node side
New information related to the address on the relay node side, such as an IP address
Old information related to the address on the relay node side, such as an IP address
Information of a transmission network layer association on the relay node side, including one or more transmission network layer associations on the relay node side; for a transmission network layer association on the relay node side, the information includes at least one of the following information:

Identification information of a transport network layer association on a relay node side IP address information Port information Indication information of a use of a transport network layer association on the relay node side In the above process, as shown in FIG. 5, before the step 2-1, it may also include a step 2-0, i.e., a step of other nodes transmitting a second configuration request message to the fourth node. The message includes the configuration information of the first node, and this information may assist the fourth node in updating the configuration information of the first node. The second configuration request message may refer to step 1-1 in the process of FIG. 4 of the present disclosure described above.

The above first configuration request message and the first configuration response message may transmit relevant information using the existing gNB-CU CONFIGURATION UPDATE and gNB-CU CONFIGURATION UPDATE ACKNOWLEDGE, respectively, or may transmit relevant information using a newly defined non-user associated F1AP message. In addition, the above first configuration request message and first configuration response message may, respectively, use the existing UE CONTEXT SETUP SETUP/MODIFICATION REQUEST and UE CONTEXT SETUP SETUP/MODIFICATION RESPONSE messages to transmit relevant information for a user, or may be other or newly defined user associated F1AP messages.

A possible beneficial effect of the above process is that when the configuration information of the data to be transmitted by the distributed unit portion of the relay node needs to be updated, signaling required for updating the configuration information can be effectively reduced according to the above process. For example, the mapping-related information interacted in the above process may assist the receiving node in updating multiple configurations simultaneously (e.g., updating the configurations of data transmission for different users simultaneously, or updating the configurations of signaling transmission simultaneously, or updating the configurations of data transmission and signaling transmission for different users simultaneously), thereby signaling overhead is saved.

The third aspect of the present disclosure is a configuration interaction process of a relay node, which involves a fifth node, a sixth node and a first node. FIG. 6 is an example of a configuration interaction process of a relay node according to an embodiment of the present disclosure. This process is related to the methods in FIGS. 3(b) and 3(c) described above, in which the source anchor node (donor node) corresponds to the fifth node in the process, the target anchor node (donor node) corresponds to the sixth node in the process, and relay node 3 corresponds to the first node in the process. In another embodiment, the fifth node and the sixth node may be two different nodes. Further, a distributed unit portion of the first node maintains connection with the fifth node, while a mobile terminal portion of the first node is served by the sixth node. Data of a distributed unit portion of the first node (such as the data of users served by the distributed unit portion, and control signaling generated by the distributed unit portion, such as an F1AP message) can be transmitted by a backhaul link channel configured by the sixth node, and can be transmitted according to the path configured by the sixth node.

As shown in FIG. 6, the configuration interaction process of the relay node includes the following steps:

Step 3-1: the fifth node transmits a third configuration request message to the sixth node. The message serves to provide the sixth node with configuration information related to the data served by the relay node (the distributed unit portion of the first node), and the message includes at least one of the following information:

Seventh user configuration information; the information is for a user which accesses the first node (the distributed unit portion of the first node); one beneficial effect of transmitting this information to the sixth node is that the sixth node may know the configuration information of the data of the user accessing the first node; information included in this information can be referred to the "configuration information of the user" described above, and specifically, includes at least one of the following information:

Identifier of a user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID, in one embodiment, the ID is assigned by the fifth node

The above identifiers are only examples and do not exclude the inclusion of other identifiers.

Information related to a radio bearer of a user; for a radio bearer (such as a data radio bearer (DRB), a signaling radio bearer (SRB)), the radio bearer may be requested to be added, modified or deleted, and the information includes at least one of the following information:

An identifier of the user, such as a gNB-CU/DU UE F1AP ID, a C-RNTI, a UE XnAP ID Identification information of the radio bearer of the user, such as UE RB ID, which can indicate a radio bearer of a specific user, in other words, indicates not only a user but also a radio bearer of the user Identification information, such as a DRB ID, a SRB ID Information related to QoS of the radio bearer, which includes configuration information of a QoS parameter of the radio bearer; in one embodiment, the information is the actual QoS information of the radio bearer; in another embodiment, the information is QoS information that needs to be satisfied by the receiving node, then the QoS information is different from the "actual QoS information of the radio bearer" described above Information related to QoS satisfied by the first node, which is used for indicating information related to the QoS that the first node can satisfy when serving the radio bearer. This information is different from the above-mentioned "information related to the QoS of the radio bearer". The information has the beneficial effect that the node receiving the information can know the QoS that the first node can satisfy when serving the radio bearer of the user, and determine how to configure other nodes to serve the radio bearer of the user, so that the first node and other nodes jointly serve the radio bearer of the user and satisfy the QoS requirements of the radio bearer. Another beneficial effect is that the node receiving the information can ensure that the first node serves the user radio bearer according to the QoS indicated by the information as much as possible, so that there is no need to modify the configuration information of the first node when serving the radio bearer of the user Information related to QoS satisfied by the node which is not the first node, which is used for indicating information related to the QoS that other nodes except the first node in the network need to satisfy when jointly serving the radio bearer. This information is different from the "information related to the QoS of the radio bearer" described above. The information has the beneficial effect that the node receiving the information can know the QoS required to be satisfied by other nodes except the first node when serving the radio bearer of the user, and determine how to configure other nodes to serve the radio bearer of the user, so that the first node and the other nodes jointly serve the radio bearer of the user and satisfy the QoS requirement of the radio bearer. Another beneficial effect is that the node receiving the information can configure the other nodes to serve the user radio bearer according to the QoS indicated by the information as much as possible, so that there is no need to modify the configuration information of the first node when serving the radio bearer of the user Information related to a tunnel of uplink data; there may be one or more tunnels; the information indicates the information on the anchor node (donor node) (the central unit of the anchor node (donor node) or the user plane portion of the central unit of the anchor node (donor node)) side, and for a tunnel, the information includes at least one of the following information:

Tunnel identification information

An IP address

A TEID routing identification information, which is used for indicating the transmission path of the uplink data (further, the uplink data being transmitted through the above tunnel), includes address information (BAP address) of the receiving node and/or transmission path identification information (path ID); further, according to the information, the relay node can add the information to the uplink data packet transmitted through the above tunnel Identification information of a next hop node, the next hop node being the node that directly receives the uplink data when the relay node transmits the uplink data (further, the uplink data being transmitted through the above tunnel), in other words, the relay node transmits the uplink data to the next hop node, the uplink data then is transmitted by the next hop node directly or indirectly (through other nodes) to the destination node of the uplink data. According to the information, the relay node knows to which node the uplink data is transmitted Identification information of a backhaul link channel, the backhaul link channel being the backhaul link channel used by the relay node when transmitting the uplink data (further, the uplink data being transmitted through the above tunnel) to the next hop node. According to the information, the relay node knows which backhaul link channel is used for transmitting the uplink data Information related to a tunnel of downlink data; there may be one or more tunnels; the information indicates the information of the relay node or the distributed unit portion of the relay node, and for a tunnel, the information includes at least one of the following information:

Tunnel identification information

An IP address

A TEID

Information on configuration value of a DSCP field in the downlink data packet (further, the downlink data packet being transmitted through the above tunnel)

Information on configuration value of a flow label field in a downlink data packet (further, the downlink data packet being transmitted through the above tunnel)

First control signaling-related information, which is used for providing information related to control signaling or control signaling transmission, includes at least one of the following information:

Information transmitted by the fifth node to the first node, such as an F1AP message; in one embodiment, the information includes an IP packet of the F1AP message; after receiving the information, the sixth node can transmit the received information to the first node Control signaling type information indicating a type of the transmitted control signaling, which may be the "information transmitted by the fifth node to the first node" included in the above "first control signaling-related information", or may be one or more control signaling transmitted between the fifth node and the first node; in one embodiment, the information may indicate that control signaling type 1, control signaling type 2, etc., and different types have different priorities, such as control signaling type 1 having the highest priority, control signaling type 2 having the next highest priority, etc.; in another embodiment, the information may indicate a UE-associated control signaling, a non-UE-associated control signaling, etc.; further, the information included in the "first control signaling-related information" is applicable to the type of the control signaling indicated by the "control signaling type information"

Destination address information for receiving a downlink control signaling, such as an IP address, a BAP address, etc.; further, the address information may be address information on the first node side Destination address information for receiving uplink control signaling, such as an IP address, a BAP address, etc.; further, the address information may be address information on the fifth node side Step 3-2: the sixth node transmits a third configuration response message to the fifth node. The message serves to provide the fifth node with configuration information related to the data served by the relay node (the distributed unit portion of the first node). In one embodiment, the configuration information may be obtained after the sixth node performs backhaul link channel and transmission path configuration on the data of the first node according to the configuration information. The message includes at least one of the following information:

Eighth user configuration information, which is for a user accessing the first node (the distributed unit portion of the first node); the information included in this information may be referred to the "configuration information of the user" described above, and specifically, includes at least one of the following information:

Identifier of the user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID1; in one embodiment, the ID is assigned by the fifth node and obtained from step 3-1 described above A UE XnAP ID2; in one embodiment, the ID is assigned by the sixth node The above identifiers are only examples and do not exclude the inclusion of other identifiers.

Information related to a radio bearer of the user; in one embodiment, the radio bearer may be a radio bearer accepted by the sixth node, or may be a radio bearer not accepted by the sixth node; for a radio bearer (such as a data radio bearer (DRB), a signaling radio bearer (SRB)), the information including at least one of the following information:

An identifier of the user, such as a gNB-CU/DU UE F1AP ID, a C-RNTI, a UE XnAP ID Identification information of the radio bearer of the user, such as a UE RB ID; the information may indicate a radio bearer of a specific user, in other words, the identification information indicates not only a user but also a radio bearer of the user.

Identification information, such as a DRB ID, a SRB ID

Information related to QoS that the sixth node can satisfy; in one embodiment, the information is the QoS that can be satisfied by the sixth node determined by the sixth node according to the condition of the network it serves; in another embodiment, the information is the QoS that can be satisfied by the sixth node determined after the sixth node configures the backhaul link channel and transmission path serving the radio bearer.

Information related to a tunnel of uplink data; there may be one or more tunnels; the information indicates the information on the anchor node (donor node) (or, the central unit of the anchor node (donor node), or the user plane portion of the central unit of the anchor node (donor node)) side, and for a tunnel, the information includes at least one of the following information:

Tunnel identification information

An IP address

A TEID

Routing identification information

Identification information of a next hop node

Identification information of a backhaul link channel

Some or all of the above information is configured by the sixth node, and if the above information is also included in step 3-1, it may be different from the information included in step 3-1

Information related to a tunnel of downlink data; there may be one or more tunnels; the information indicates the information of the relay node or the distributed unit portion of the relay node, and for a tunnel, the information includes at least one of the following information:

Tunnel identification information

An IP address

A TEID

Information on configuration value of a DSCP field in the downlink data packet (further, the downlink data packet being transmitted through the above tunnel)

Information on configuration value of a flow label field in a downlink data packet (further, the downlink data packet being transmitted through the above tunnel)

Some or all of the above information is generated by the sixth node.

After receiving the information, the fifth node may add the above configuration value of the DSCP field and/or the configuration value of the flow label field to a relevant data packet transmitted to the first node, according to the information.

First tunnel information, which indicates address-related information used by the sixth node when receiving user data from the fifth node; in one embodiment, the sixth node will forward the data to the first node after receiving the data. The information includes at least one of the following information:

Tunnel identification information

An IP address

A TEID

The use of this information is related to the method of FIG. 3(*c*), i.e., the method of the fifth node transmits a data packet to the sixth node according to the address indicated by this information, and the sixth node will transmit the data packet to the first node after receiving the data packet. Before transmitting the data packet, the sixth node may replace the information included in the data packet with the information included in the above "information related to the tunnel of the downlink data", for example, replace the IP address in the data packet with the IP address included in the above "information related to the tunnel of the downlink data".

Second tunnel information, which indicates address-related information used by the sixth node when receiving user data from the first node; in one embodiment, the sixth node will forward the data to the fifth node after receiving the data; the information includes at least one of the following information:

Tunnel identification information

An IP address

A TEID

The use of this information is related to the method of FIG. 3(*c*), i.e., the first node transmits a data packet to the sixth node according to the address indicated by this information, and the sixth node will transmit the data packet to the fifth node after receiving the data packet. Before transmitting the data packet, the sixth node may replace the information included in the data packet with the information included in the above "information related to the tunnel of the uplink data", for example, replace the IP address in the data packet with the IP address included in the above "information related to the tunnel of the uplink data". Therefore, if the above "second tunnel information" is included, the fifth node will transmit the information to the first node Second control signaling-related information, which is used for providing information related to control signaling or control signaling transmission, includes at least one of the following information:

Information transmitted by the first node to the fifth node, such as an F1AP message; in one embodiment, the information includes an IP packet of the F1AP message; this information may be transmitted from the first node to the sixth node Control signaling type information, which indicates a type of the transmitted control signaling, which may be the "information transmitted by the first node to the fifth node" included in the above "second control signaling-related information" or one or more control signaling transmitted between the first node and the fifth node; in one embodiment, the information may indicate that control signaling type 1, control signaling type 2, etc., and that different types have different priorities, such as control signaling type 1 having the highest priority, control signaling type 2 having the next highest priority, etc.; in another embodiment, the information may indicate a UE-associated control signaling, a non-UE-associated control signaling, etc.; further, the information included in the above "second control signaling-related information" is applicable to the type of the control signaling indicated by the "control signaling type information"

Destination address information for receiving a downlink control signaling, such as an IP address, a BAP address, etc.; further, the address information may be address information on the first node side Information on configuration value of a DSCP field in a data packet carrying a control signaling Information on configuration value of a flow label field in a data packet carrying a control signaling Destination address information for receiving an uplink control signaling, such as an IP address, a BAP address, etc.; further, the address information may be address information on the fifth node side Identification information of routing, which is used for indicating a transmission path of a control signaling (in one embodiment, the control signaling is control signaling transmitted by the first node), includes address information (a BAP address) of the receiving node (such as the distributed unit of the sixth node) and/or transmission path identification information (a path ID); further, according to the information, the first node can add the information to the data packet carrying the control signaling Identification information of a next-hop node, which is a node that directly receives the control signaling when the first node transmits the control signaling; in other words, the first node transmits the control signaling to the next-hop node, and then the next-hop node transmits it directly or indirectly (through other nodes) to the destination node. Based on this information, the first node knows to which node the control signaling is transmitted Identification information of a backhaul link channel, which is a backhaul link channel used when the first node transmits a control signaling to the above next hop node. Based on this information, the first node knows the backhaul link channel over which the control signaling is transmitted Eighth mapping relation information, which reflects a mapping relation before and after the first node configuration information is updated. This information is used for updating the configuration information used by the first node when performing data transmission. The contents included in this information may be referred to the "mapping-related information" described above. The new information in this information is information required to be used by the first node after the configuration is updated, while the old information is information used by the first node before the configuration is updated. The beneficial effect of this information is that it may assist the first node in updating the configuration information required for transmission of the data (e.g. data of different users, an F1AP signaling, etc.) of its distributed unit portion with less signaling, without using multiple different signaling to update the configuration information required for transmission of different data respectively The above process may also include a step 3-3 after the step 3-2, i.e., a step of the fifth node transmitting a fourth configuration request message to the first node. The message is used for transmitting some or all of the configuration information received in step 3-2 to the first node. For example, for a radio bearer, the message is used for transmitting the received "information related to the tunnel of uplink data" to the first node. The information transmitted to the first node in step 3-3 may be referred to the information received in step 3-2 above, and will not be described in detail here.

The above process may also include a step 3-0 before the step 3-1, that is, a user data configuration interaction procedure, in which the fifth node and the first node may interact with configuration information of data served by the first node, such as configuration information of a radio bearer of a user (see the "configuration information of the user" described above), which assists the fifth node in generating the information in step 3-1 described above.

The above process can be carried out for only one user, multiple users, or control signaling (i.e. the above steps 3-1 and 3-2 are used for transmitting information related to control signaling, see the above information related to the first control signaling and information related to the second control signaling).

When the fifth node and the sixth node are two different nodes, the foregoing process may also include the following implementation:

Both the fifth node and the sixth node serve the first node, for example, the fifth node and the sixth node are two different anchor nodes (donor nodes), or central units of two different anchor nodes (donor nodes). The first node (or the mobile terminal portion of the first node, or the distributed unit portion of the first node) may be served by these two nodes (in one embodiment, the mobile terminal portion of the first node is configured with dual connectivity, and is connected to the fifth node and the sixth node, respectively), for another example, the data served by the distributed unit portion of the first node will be served by the network controlled by the fifth node and/or the sixth node; further, a seventh node may also be included in this implementation (in one embodiment, the seventh node may also be a relay node), the seventh node accesses the network through the first node, and the seventh node may be directly connected to the first node, and may also be connected to the first node through one or more nodes; further, the data served by the seventh node (such as the data of users accessing the seventh node, the data of the seventh node itself, such as the data of the distributed unit portion of the seventh node) may also be served by the network controlled by the fifth node and/or the sixth node. In this implementation, the interaction process is shown in FIG. 6.

Step 3-1: the fifth node transmits a third configuration request message to the sixth node. The message serves to provide the sixth node with configuration information related to the data served by the relay node (such as the distributed unit portion of the first node), and the message includes at least one of the following information:

Identification information of the first node; in one embodiment, the identification information is identification information of the mobile terminal portion of the first node, such as an XnAP UE ID; in another embodiment, the identification information is identification information of the distribution unit portion of the first node, such as a gNB-DU ID, a BAP address, etc.

Seventh user configuration information; the information may be for a user who accesses the first node (the distributed unit portion of the first node), or a user who accesses the seventh node (the distribution unit portion of the seventh node), or the distributed unit portion of the first node, or the distributed unit portion of the seventh node; one beneficial effect of transmitting this information to the sixth node is that the sixth node may know the configuration information of the data of the user; information included in this information can be referred to the "configuration information of the user" described above, and specifically, includes at least one of the following information:

Identifier of a user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID, in one embodiment, the ID is assigned by the fifth node

The above identifiers are only examples and do not exclude the inclusion of other identifiers.

Information related to user data; in one embodiment, the user data may be data of one or more radio bearers, for a radio bearer (such as a data radio bearer (DRB), a signaling radio bearer (SRB)), the radio bearer may be requested to be added, modified or deleted. Further, the user data may be user data served by the first node (such as data of users accessing the first node, or data generated by the first node itself, or data generated by the distribution unit portion of the first node). In addition, the user data may be uplink data, or downlink data, or uplink data and downlink data. The information includes at least one of the following information:

Identification information of the user data; this information serves to identify a type of data, such as a traffic profile ID and a traffic ID Information related to QoS of the user data, which includes configuration information of a QoS parameter of the user data; the content included in this configuration information can be referred to the "Information related to the Quality of Service (QoS) of the radio bearer" described above. In one embodiment, the information is the actual QoS information of the user data; in another embodiment, the information is QoS information that needs to be satisfied by the receiving node, then the QoS information is different from the "actual QoS information of the user data" described above, and further, the user data may be one or more radio bears Indication information of the user data transmission direction, such as uplink or downlink Indication information of the user data type, the types indicated by the information include at least one of the following types:

User plane data, such as F1-U interface data

Control plane data, such as F1-C interface data

Control plane data associated with the user, such as UE-associated F1-C data

Control plane data not associated with the user, such as non-UE-associated F1-C data Non-F1 interface data, such as non-F1 data BAP layer control data, such as BAP Control PDU///

Information related to the address; in one embodiment, the information is address-associated information, the information includes IP address information and/or port information, and further, the information is used to serve control plane data IP address information; in one embodiment, the IP address is the IP address used by the first node and/or the seventh node to receive data, and in another embodiment, the IP address is the IP address used by the first node and/or the seventh node when receiving data on a tunnel First information related to data routing; this information indicates information that needs to be used when transmitting user data (such as the information that needs to be carried in the data packet), in one embodiment, the information is the BAP routing identification information (in one embodiment, the information includes BAP address information and/or path identification information, further, the BAP address information is the BAP address of the destination receiving node), and further, the BAP routing identification information is information used when sending downlink data and/or uplink data. In addition, the information may be the information configured by the fifth node, and further, the information required to be used by the fifth node to configure the sixth node An identifier of the user, such as a gNB-CU/DU UE F1AP ID, a C-RNTI, a UE XnAP ID Identification information of the radio bearer of the user, such as a UE RB ID, which can indicate a radio bearer of a specific user, in other words, the identification information indicates not only a user but also a radio bearer of the user Identification information of the radio bearer, such as a DRB ID, a SRB ID Information related to the tunnel of the downlink data; there may be one or more tunnels; the information indicates the information of the relay node or the distribution unit portion of the relay mode, in one embodiment, the relay node may be the first node, and in another embodiment, the relay node may be the seventh node; and for a tunnel, the information includes at least one of the following information:

Tunnel identification information

An IP address

A TEID

Information on configuration value of a DSCP field in downlink data packet (further, the downlink data packet being transmitted through the above tunnel)

Information on configuration value of a flow label field in downlink data packet (further, the downlink data packet being transmitted through the above tunnel)

Information related to a tunnel of uplink data; there may be one or more tunnels; the information indicates the information on the anchor node (donor node) (or the central unit of the anchor node (donor node) or the user plane portion of the central unit of the anchor node (donor node)) side, in one embodiment, the anchor node (donor node) is the fifth node, and in another embodiment, the anchor node (donor node) is the sixth node; and for a tunnel, the information includes at least one of the following information:

Tunnel identification information

An IP address

A TEID

Routing identification information, which is used for indicating the transmission path of the uplink data (further, the uplink data being transmitted through the above tunnel), includes address information (BAP address) of the receiving node and/or transmission path identification information (path ID); further, according to the information, the relay node can add the information into the uplink data packet transmitted through the above tunnel Identification information of a next-hop node, the next-hop node being the node that directly receives the uplink data when the relay node transmits the uplink data (further, the uplink data being transmitted through the above tunnel), in other words, the relay node transmits the uplink data to the next-hop node, the uplink data then is transmitted by the next-hop node directly or indirectly (through other nodes) to the destination node of the uplink data. According to the information, the relay node knows to which node the uplink data is transmitted Identification information of a backhaul link channel, the backhaul link channel being the backhaul link channel used by the relay node when transmitting the uplink data (further, the uplink data being transmitted through the above tunnel) to the next-hop node. According to the information, the relay node knows which backhaul link channel is used for transmitting the uplink data Step 3-2: the sixth node transmits a third configuration response message to the fifth node. The message serves to provide the fifth node with configuration information related to the data served by the relay node (the distributed unit portion of the first node, or the distributed unit portion of the seventh node). In one embodiment, the configuration information may be obtained after the sixth node performs backhaul link channel and transmission path configuration on the data of the first node (or the data of the seventh node) according to the configuration information. The message includes at least one of the following information:

Identification information of the first node; in one embodiment, the identification information is identification information of the mobile terminal portion of the first node, such as an XnAP UE ID; and in another embodiment, the identification information is identification information of the distribution unit portion of the first node, such as a gNB-DU ID, a BAP address, etc.

Eighth user configuration information, which is for a user accessing the first node (the distributed unit portion of the first node), or a user accessing the seventh node (the distribution unit portion of the seventh node), or the distributed unit portion of the first node, or the distributed unit portion of the seventh node; the information included in this information may be referred to the "configuration information of the user" described above, and specifically, includes at least one of the following information:

Identifier of the user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID1; in one embodiment, the ID is assigned by the fifth node and obtained from step 3-1 described above A UE XnAP TD2; in one embodiment, the ID is assigned by the sixth node The above identifiers are only examples and do not exclude the inclusion of other identifiers.

Information related to user data; in one embodiment, the user data may be data of one or more radio bearers, the data may be user data which can be served by the sixth node, or may be user data which is not served by the sixth node. Further, the user data may be user data served by the first node (such as data of a user accessing the first node, or data generated by the first node itself, or data generated by the distribution unit portion of the first node). In addition, the data may be uplink data, or downlink data, or uplink data and downlink data. The information includes at least one of the following information:

Identification information of the user data; this information serves to identify a type of data, such as a traffic profile ID and a traffic ID Configuration information related to downlink data packet; this information serves to indicate the configuration information required to be used for downlink data transmission, and the information includes at least one of the following information:

Information on configuration value of a DSCP field of the downlink data packet

Information on configuration value of a flow label field of a downlink data packet Second information related to data routing; this information indicates information that needs to be used when transmitting user data (such as the information that needs to be carried in the data packet), in one embodiment, the information is the BAP routing identification information (in one embodiment, the information includes BAP address information and/or path identification information, further, the BAP address information is the BAP address of the destination receiving node, such as the BAP address of the first node or the seventh node, or it may be a BAP address of a non-destination receiving node, e.g., when the data is transmitted to the seventh node, the non-destination receiving node can be the first node). Further, the information may be the "First information related to data routing" received in step 3-1, and may also be information set by the sixth node (such as information different from the above "First information related to data routing", for another example, when the sixth node finds the "First information related to data routing" received in step 3-1 has been used by the sixth node for transmission of other data, it can provide the fifth node with update information, that is, information different from the above "First information related to data routing"). Further, after the fifth node receives the information, it can be used to configure transmission of the data, such as configuring the transmission of the user data at the first node Configuration information for receiving the user data; this configuration information serves to indicate the configuration information used by the relay node when receiving the user data. In one embodiment, the relay node may be the first node, and the information may be used by the fifth node to configure the first node. The information includes at least one of the following information:

Indication information of a cell group; this information serves to indicate the cell group required for receiving the user data, such as an MCG, a SCG, a Cell Group ID. In one embodiment, this information may indicate the cell group required by the first node to receive the user data Identification information of a prior-hop node, such as a gNB-ID, identification information of a cell group, BAP address information. In one embodiment, the prior-hop node is the node that transmits the data to the first node Identification information of the backhaul link channel for receiving data (an ingress BackHaul Radio Link Control channel (an ingress BH RLC channel)). In one embodiment, the backhaul link channel may be the backhaul link channel for the first node to receive the data Configuration information related to uplink data packet; this information serves to indicate the configuration information required to be used for uplink data transmission, and the information includes at least one of the following information:

Third information related to data routing; this information indicates information that needs to be used when transmitting user data (such as the information that needs to be carried in the data packet), in one embodiment, the information is the BAP routing identification information (in one embodiment, the information includes BAP address information and/or path identification information, further, the BAP address information may be the BAP address of the destination receiving node). Further, after the fifth node receives the information, it may be used for configuring the transmission of the data, e.g., configuring the transmission of the user data at the first node Configuration information for transmitting the user data; this configuration information serves to indicate the configuration information used by the relay node when transmitting the user data. In one embodiment, the relay node may be the first node, and the information may be used by the fifth node to configure the first node. The information includes at least one of the following information:

Indication information of a cell group; this information serves to indicate the cell group required for transmitting the user data, such as a MCG, a SCG, a Cell Group ID. In one embodiment, this information may indicate the cell group required by the first node to transmit the user data Identification information of a next-hop node, such as a gNB-ID, identification information of a cell group, BAP address information. In one embodiment, the next-hop node is the node that receives the data transmitted by the first node Identification information of the backhaul link channel used for transmitting data (an egress BackHaul Radio Link Control channel (an egress BH RLC channel)). In one embodiment, the backhaul link channel may be the backhaul link channel used for the first node to transmit the data An identifier of the user, such as a gNB-CU/DU UE F1AP ID, a C-RNTI, a UE XnAP ID Identification information of the radio bearer of the user, such as a UE RB ID; the information may indicate a radio bearer of a specific user, in other words, the identification information indicates not only a user but also a radio bearer of the user Identification information, such as a DRB ID, a SRB ID Information related to QoS that the sixth node can satisfy; in one embodiment, the information is the QoS that can be satisfied by the sixth node, which is determined by the sixth node according to the condition of the network it serves; in another embodiment, the information is the QoS that can be satisfied by the sixth node, which is determined after the sixth node configures the backhaul link channel and transmission path serving the radio bearer Information related to a tunnel of uplink data; there may be one or more tunnels; the information indicates the information on the anchor node (donor node) (or the central unit of the anchor node (donor node), or the user plane portion of the central unit of the anchor node (donor node)) side, and for a tunnel, the information includes at least one of the following information:

Tunnel identification information

An IP address

A TEID

Routing identification information

Identification information of a next-hop node

Identification information of a backhaul link channel

Some or all of the above information is configured by the sixth node, and if the above information is also included in step 3-1, it may be different from the information included in step 3-1.

Information related to a tunnel of downlink data; there may be one or more tunnels; the information indicates the information of the relay node or the distributed unit portion of the relay node, and for a tunnel, the information includes at least one of the following information:

Tunnel identification information

An IP address

A TEID

Information on configuration value of a DSCP field in the downlink data packet (further, the downlink data packet being transmitted through the above tunnel)

Information on configuration value of a flow label field in a downlink data packet (further, the downlink data packet being transmitted through the above tunnel)

Some or all of the above information is generated by the sixth node.

After receiving the information, the fifth node may add the above configuration value of the DSCP field and/or the configuration value of the flow label field to a relevant data packet transmitted to the first node, according to the information.

The above process may also include a step 3-3 after the step 3-2, i.e., a step of the fifth node transmitting a fourth configuration request message to the first node. The message is used for configuration of transmission and/or receipt of the data at the first node. The data may be the data of the first node (such as the data of the user accessing the first node, or the data of the distribution unit portion of the first node), or the data of the seventh node (such as the data of the user accessing the seventh node, or the data of the distribution unit portion of the seventh node), the message includes at least one of the following information:

Indication information of a cell group, such as a MCG, a SCG, a Cell Group ID. In one embodiment, this information serves to indicate the cell group (such as an ingress cell group) required by the first node to receive the user data, and the received data may need to be transmitted by the first node; and in another embodiment, the information serves to indicate the cell group (such as an egress cell group) required by the first node to transmit the user data Identification information of a prior-hop node, such as a gNB-ID, identification information of a cell group, BAP address information. In one embodiment, the prior-hop node is the node that transmits the data to the first node, and the data may need to be transmitted by the first node Identification information of the backhaul link channel for receiving data (an ingress BH RLC channel). In one embodiment, the backhaul link channel may be the backhaul link channel used by the first node to receive the data, and the received data may need to be transmitted by the first node Identification information of a next-hop node, such as a gNB-ID, identification information of a cell group, and BAP address information. In one embodiment, the next-hop node is the node that receives the data transmitted by the first node Identification information of the backhaul link channel used for transmitting data (an egress BH RLC channel). In one embodiment, the backhaul link channel may be the backhaul link channel used by the first node to transmit the data Routing identification information included in the received data, such as an ingress BAP routing ID. In one embodiment, this information is BAP routing identification information (in one embodiment, the information includes BAP address information and/or path identification information, further, the BAP address information is the BAP address of the destination receiving node, such as the BAP address of the first node or the seventh node, or the BAP address of the distribution unit portion of the fifth node or the sixth node, or it may be a BAP address of a non-destination receiving node, e.g., when the data is transmitted to the seventh node, the non-destination receiving node can be the first node). In another embodiment, the information is the "Second information related to data routing" in step 3-2 described above New routing identification information or routing identification information for transmitting data, such as a new BAP routing ID, or an egress BAP routing ID; this information indicates routing identification information that needs to be added when the first node transmits the data, or indicates that, when transmitting the data, the first node needs to update the routing identification information included in the data packet to the routing identification indicated by the information. In one embodiment, the information is the BAP routing identification information (in one embodiment, the information includes BAP address information and/or path identification information. Further, the BAP address information is the BAP address of the destination receiving node, such as the BAP address of the first node or the seventh node, or it may be a BAP address of the distribution unit portion of the fifth node or the sixth node, or it may be a BAP address of a non-destination receiving node, e.g., when the data is transmitted to the seventh node, the non-destination receiving node can be the first node). Further, this information can be used to update the information in the data packet received by the first node. In one embodiment, the first node can update the routing identification information carried in any data packet received to the "new routing identification information". In another embodiment, the first node may update the routing identification in the received data packet containing the above "routing identification information included in the received data" to the "new routing identification information". In another embodiment, the first node may update the routing identification information of the received specific data (for example, the data is transmitted through the cell group indicated by the above "indication information of a cell group", and/or the data is transmitted by the node as indicated by the above "identification information of a prior-hop node", and/or the data is received by the channel as indicated by the above "identification information of the backhaul link channel for receiving data (an ingress BH RLC channel)") to the "new routing identification information". In another embodiment, the information may be the "First information related to data routing" in step 3-1 described above. In another embodiment, the information may be the "Third information related to data routing" in step 3-2 described above The third configuration request message and the third configuration response message in the above process may be a UE-associated message or a non-UE-associated message, and the existing Xn interface messages such as the NG-RAN Node configuration update and NG-RAN node configuration update acknowledge messages in TS38.423 may be reused respectively, for another example, S-Node addition/modification request message and S-Node addition/modification Response message (further, S-Node addition/modification request and S-Node addition/modification Response message can be for the mobile terminal portion of the first node, or for the user accessing the first node or the seventh node), and new messages such as a UE Bearer Context Setup/Modification Request message and a UE Bearer Context Setup/Modification Response message may also be defined (the newly defined message may be for the mobile terminal portion of the first node, or for the user accessing the first node or the seventh node). The third configuration request message and the third configuration response message may also be other messages.

The above fourth configuration request message may be an RRC message (such as a RRCReconfiguration message) or an F1AP message (such as a BAP MAPPING CONFIGURATION message, a BAP mapping configuration message).

Further, when the above process is used to configure the sixth node to serve one or more users accessing the first node or the seventh node, the above process is different from the existing S-Node addition/modification process on the Xn interface, which aims to add a secondary node for a user or modify the configuration of the secondary node. However, in the above process of the present disclosure, the sixth node is not the secondary node, the user is connected to the fifth node, the sixth node only configures the backhaul link channel and transmission path used for the data transmission of the user, and the sixth node does not configure the radio bearer of the user.

The beneficial effects of the above process include at least the following: when the relay node migrates, the communication between the relay node and the source node can be maintained, and the interruption of user data transmission and the increase of latency can be avoided; when the relay node is connected to multiple anchor nodes (donor nodes), it is possible to transmit the user data through the multiple anchor nodes (donor nodes), share the load of the relay node, and allow the data of the relay node to be transmitted in the networks served by different anchor nodes (donor nodes).

The third aspect of the present disclosure also includes another process, that is, the configuration interaction process of the relay node triggered by the sixth node. FIG. 7 is another example of the configuration interaction process of the relay node according to the embodiment of the present disclosure. As shown in FIG. 7, the process includes the following steps:

Step 4-1: a sixth node transmits a fifth configuration request message to a fifth node. The message serves to update to the fifth node the configuration information for serving the data of the relay node, and includes at least one of the following information:

Eighth user configuration information, which is for a user accessing the first node (the distributed unit portion of the first node); the information included in this information may be referred to the "configuration information of the user" described above, and specifically, includes at least one of the following information:

Identifier of the user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID, in one embodiment, the ID is assigned by the fifth node

The above identifiers are only examples and do not exclude the inclusion of other identifiers.

Information related to a radio bearer of a user; for a radio bearer (such as a data radio bearer (DRB), a signaling radio bearer (SRB)), the radio bearer may be required to be modified or deleted (if required to be deleted, the fifth node may delete the radio bearer after receiving it), and the information includes at least one of the following information:

An identifier of the user, such as a gNB-CU/DU UE F1AP ID, a C-RNTI, a UE XnAP ID Identification information of the radio bearer of the user, such as UE RB ID, which can indicate a radio bearer of a specific user, in other words, this information indicates not only a user but also a radio bearer of the user Identification information, such as a DRB ID, a SRB ID Information related to QoS satisfied by the sixth node, which is used for indicating information related to QoS that the sixth node can satisfy when serving the radio bearer. The information has the beneficial effect that the node receiving the information can know the QoS that the sixth node can satisfy when serving the radio bearer of the user, and determine how to configure the first node to serve the radio bearer of the user Information related to a tunnel of uplink data; there may be one or more tunnels; the information indicates the information at the anchor node (donor node) (or, the central unit of the anchor node (donor node), or the user plane portion of the central unit of the anchor node (donor node)) side, and for a tunnel, the information includes at least one of the following information: tunnel identification information, an IP address, a TEID, routing identification information, identification information of a next hop node, identification information of a backhaul link channel, etc.

Information related to a tunnel of downlink data; there may be one or more tunnels; the information indicates the information of the relay node or the distributed unit portion of the relay node, and for a tunnel, the information includes at least one of the following information: tunnel identification information, an IP address, a TEID, information on configuration value of a DSCP field, and information on configuration value of a flow label field Reason information, which indicates a reason for modifying or deleting the radio bearer, such as resource limitation, etc.

First tunnel information, which indicates address-related information used by the sixth node when receiving user data from the fifth node; in one embodiment, the sixth node will forward the data to the first node after receiving the data. The information includes at least one of the following information:

Tunnel identification information

An IP address

A TEID

The use of this information is related to the method of FIG. 3(c), i.e., the method of the fifth node transmits a data packet to the sixth node according to the address indicated by this information, and the sixth node will transmit the data packet to the first node after receiving the data packet. Before transmitting the data packet, the sixth node may replace the information included in the data packet with the information included in the above "information related to the tunnel of the downlink data", for example, replace the IP address in the data packet with the IP address included in the above "information related to the tunnel of the downlink data".

Second tunnel information, which indicates address-related information used by the sixth node when receiving user data from the first node; in one embodiment, the sixth node will forward the data to the fifth node after receiving the data; the information includes at least one of the following information:

Tunnel identification information

An IP address

A TEID

The use of this information is related to the method of FIG. 3(c), i.e., the method of the first node transmits a data packet to the sixth node according to the address indicated by this information, and the sixth node will transmit the data packet to the fifth node after receiving the data packet. Before transmitting the data packet, the sixth node may replace the information included in the data packet with the information included in the above "information related to the tunnel of the uplink data", for example, replace the IP address in the data packet with the IP address included in the above "information related to the tunnel of the uplink data". Therefore, if the above "second tunnel information" is included, the fifth node will transmit the information to the first node.

Third control signaling-related information, which is used for providing information related to control signaling or control signaling transmission, includes at least one of the following information:

Information transmitted by the first node to the fifth node, such as an F1AP message; in one embodiment, the information includes an IP packet of the F1AP message; this information may be transmitted from the first node to the sixth node Control signaling type information, which indicates a type of the transmitted control signaling, which may be the "information transmitted by the first node to the fifth node" included in the above "third control signaling-related information" or one or more control signaling transmitted between the first node and the fifth node; in one embodiment, the information may indicate control signaling type 1, control signaling type 2, etc., and different types have different priorities, such as control signaling type 1 having the highest priority, control signaling type 2 having the next highest priority, etc.; in another embodiment, the information may indicate a UE-associated control signaling, a non-UE-associated control signaling, etc.; further, the information included in the above "third control signaling-related information" is applicable to the type of the control signaling indicated by the "control signaling type information"

Destination address information for receiving a downlink control signaling, such as an IP address, a BAP address, etc.; further, the address information may be address information on the first node side Information on configuration value of a DSCP field in data packet carrying a control signaling Information on configuration value of a flow label field in a data packet carrying a control signaling Destination address information for receiving an uplink control signaling, such as an IP address, a BAP address, etc.; further, the address information may be address information on the fifth node side Identification information of routing, which is used for indicating a transmission path of a control signaling (in one embodiment, the control signaling is control signaling transmitted by the first node), includes address information (a BAP address) of the receiving node (such as the distributed unit of the sixth node) and/or transmission path identification information (a path ID); further, according to the information, the first node can add the information to the data packet carrying the control signaling Identification information of a next-hop node, which is a node that directly receives the control signaling when the first node transmits the control signaling; in other words, the first node transmits the control signaling to the next-hop node, and then the next-hop node transmits it directly or indirectly (through other nodes) to the destination node. According to this information, the first node knows to which node the control signaling is transmitted Identification information of a backhaul link channel, which is a backhaul link channel used when the first node transmits a control signaling to the above next hop node. According to this information, the first node knows over which backhaul link channel the control signaling is transmitted Step 4-2: The fifth node transmits a fifth configuration response message to the sixth node. The message serves to feed back the result of configuration update, and includes at least one of the following information:

Ninth user configuration information; the information is for a user which accesses the first node (the distributed unit portion of the first node); information included in this information can be referred to the above "configuration information of the user", and specifically, includes at least one of the following information:

Identifier of the user, such as a gNB-CU/DU UE F1AP ID, a C-RNTI, a UE XnAP ID; in one embodiment, the information may include the identifiers of multiple users, then the information may include at least one of the following information:

A gNB-CU UE F1AP ID

A gNB-DU UE F1AP ID

A C-RNTI

Identification of a serving cell

A UE XnAP ID, in one embodiment, the ID is assigned by the fifth node

The above identifiers are only examples and do not exclude the inclusion of other identifiers.

Information related to a radio bearer of the user, for a radio bearer (such as a data radio bearer (DRB), a signaling radio bearer (SRB)); the information may be used for indicating whether the fifth node has accepted the request to modify or delete the radio bearer in step 4-1 described above, and includes at least one of the following information:

An identifier of the user, such as a gNB-CU/DU UE F1AP ID, a C-RNTI, a UE XnAP ID Identification information of the radio bearer of the user, such as a UE RB ID; the information may indicate a radio bearer of a specific user, in other words, the identification information indicates not only a user but also a radio bearer of the user.

Identification information, such as a DRB ID, a SRB ID

Reason information, which indicates a reason for modifying or deleting the radio bearer, such as resource limitation, etc.

Fourth control signaling-related information, which is used for providing information related to control signaling or control signaling transmission, includes at least one of the following information:

Information transmitted by the fifth node to the first node, such as an F1AP message; in one embodiment, the information includes an IP packet of the F1AP message; after receiving the information, the sixth node will transmit the received information to the first node Control signaling type information, which indicates a type of the transmitted control signaling, which may be the "information transmitted by the fifth node to the first node" included in the above "fourth control signaling-related information" or one or more control signaling transmitted between the fifth node and the first node; in one embodiment, the information may indicate control signaling type 1, control signaling type 2, etc., and different types have different priorities, such as control signaling type 1 having the highest priority, control signaling type 2 having the next highest priority, etc.; in another embodiment, the information may indicate a UE-associated control signaling, a non-UE-associated control signaling, etc.; further, the information included in the above "fourth control signaling-related information" is applicable to the type of the control signaling indicated by the "control signaling type information"

Destination address information for receiving a downlink control signaling, such as an IP address, a BAP address, etc.; further, the address information may be address information on the first node side Destination address information for receiving an uplink control signaling, such as an IP address, a BAP address, etc.; further, the address information may be address information on the fifth node side In the above process, after the step 4-2, a step 4-3 may also be included. That is, the fifth node transmits a sixth configuration request message to the first node, and the message configures the first node according to the configuration information received in step 4-1. For example, for a radio bearer, the "information related to the tunnel of the uplink data" received is transmitted to the first node. The information transmitted to the first node in step 4-3 may be referred to the information received in step 4-1 above, and will not be described in detail here.

The above process can be carried out for only one user, or for multiple users, or for control signaling (i.e. the above steps 4-1 and 4-2 are used for transmitting information related to control signaling, see the above information related to the third control signaling and information related to the fourth control signaling).

The third configuration request message and the third configuration response message in the above process may be a UE-associated message or a non-UE-associated message, and the existing Xn interface messages such as the NG-RAN Node configuration update and NG-RAN node configuration update acknowledge messages in TS38.423 may be reused respectively, and new messages such as a UE Bearer Context Modification Required Message and a UE Bearer Context Modification Confirm message may also be defined. The third configuration request message and the third configuration response message may also be other messages.

The above process is different from the process of the existing S-Node modification required message on the Xn interface, which aims to modify the configuration of the secondary node. However, in the above process of the present disclosure, the sixth node is not the secondary node of the user, and the user is connected to the fifth node, the sixth node only configures the backhaul link channel and transmission path used for the data transmission of the user, and the sixth node does not configure the radio bearer of the user.

The processes have the following beneficial effects:
1. By interacting the configuration information related to the data served by the relay node, it can help the anchor node (donor node) (the above sixth node) to configure the backhaul link channel and transmission path required for serving the data of the relay node, thereby facilitating the transmission of the data of the relay node through the network controlled by other anchor nodes (donor nodes), and reducing the load of the network served by the anchor node (donor node) connected by the relay node;
2. By interacting the configuration information related to the data served by the relay node, it can help the anchor node (donor node), which the relay node is connected to, to configure the transmission of data, such as to determine the information required to be included in the downlink data packet (such as a configuration value of a DSCP field and a configuration value of a flow label field), to configure the information required to be included in the uplink data packet (such as routing identification information), to configure the transmission of the uplink data packet, such as to determine a next hop node and to determine a backhaul link channel to be adopted;
3. The data of the first node can be transmitted to the fifth node through the central unit of the sixth node, and the data of the fifth node can be transmitted to the first node through the central unit of the sixth node; alternatively, the data of the first node can be transmitted to the fifth node through the distributed unit of the sixth node, and the data of the fifth node can be transmitted to the first node through the distributed unit of the sixth node, so that migration of the distributed unit of the relay node may be avoided, signaling overhead in the migration process of the relay node may be reduced, and migration of the relay node may be accelerated.

The contents of the three aspects of the present disclosure can also be combined with each other, and several examples are given below to illustrate:

Embodiment 4-1 (the combination of the first aspect and the second aspect results in the migration and configuration update process of the relay node), and FIG. 8 is an example of the migration and configuration update process of a relay node according to the embodiment of the present disclosure. As shown in FIG. 8, the process includes the following steps:
  Step 4-1-1: a second node transmits a handover request message to a third node, see step 1-1 of the first aspect of the present disclosure;
  Step 4-1-2: the third node transmits a handover response message to the second node, see step 1-2 of the first aspect of the present disclosure;
  Step 4-1-3: the second node transmits a migration configuration message to a first node, see step 1-3 of the first aspect of the present disclosure;
  Step 4-1-4: the first node transmits a migration configuration completion message to the third node, see step 1-4 of the first aspect of the present disclosure;
  Step 4-1-5: the third node transmits a first configuration request message to the first node, see step 2-1 of the second aspect of the present disclosure;
  Step 4-1-6: the first node transmits a first configuration response message to the third node, see step 2-2 of the second aspect of the present disclosure.

Embodiment 4-2 (the combination of the first aspect and the third aspect results in a migration and configuration interaction process of relay node), and FIG. 9 is an example of a migration and configuration interaction process of a relay node according to an embodiment of the present disclosure. As shown in FIG. 9, the process includes the following steps:
  Step 4-2-1: a second node transmits a handover request message to a third node, see step 1-1 of the first aspect of the present disclosure;
  Step 4-2-2: the third node transmits a handover response message to the second node, see step 1-2 of the first aspect of the present disclosure;
  Step 4-2-3: the second node transmits a migration configuration message to a first node, see step 1-3 of the first aspect of the present disclosure;
  Step 4-2-4: the first node transmits a migration configuration completion message to the third node, see step 1-4 of the first aspect of the present disclosure;
  Step 4-2-5: the second node transmits a third configuration request message to the third node, see step 3-1 of the third aspect of the present disclosure;
  Step 4-2-6: the third node transmits a third configuration response message to the second node, see step 3-2 of the third aspect of the present disclosure.

Embodiment 4-3 (the combination of the first aspect and the third aspect results in a migration and configuration interaction process of relay node), and FIG. 10 is another example of a migration and configuration interaction process of a relay node according to an embodiment of the present disclosure. As shown in FIG. 10, the process includes the following steps:
  Step 4-3-1: a second node transmits a handover request message to a third node, see Step 1-1 of the first aspect of the present disclosure;
  Step 4-3-2: the third node transmits a handover response message to the second node, see Step 1-2 of the first aspect of the present disclosure;
  Step 4-3-3: the second node transmits a migration configuration message to a first node, see Step 1-3 of the first aspect of the present disclosure;
  Step 4-3-4: the first node transmits a migration configuration completion message to the third node, see Step 1-4 of the first aspect of the present disclosure;

Step 4-3-5: the third node transmits a fifth configuration request message to the second node, see Step 4-1 of the third aspect of the present disclosure;

Step 4-3-6: the second node transmits a fifth configuration response message to the third node, see step 4-2 of the third aspect of the present disclosure.

Effects of the Disclosure

Based on the inventive content of the first aspect, the beneficial effects include at least:
1. Completing migration of a relay node between different anchor nodes (donor nodes), such as handover of a mobile terminal portion of the relay node between the different anchor nodes (donor nodes), and migration of users served by a distributed unit portion of the relay node between the different anchor nodes (donor nodes). The handover of each user needs to perform the handover process separately in the traditional technology, while the above processes can complete the handover of multiple users simultaneously, which is different from the traditional technology.
2. In migration process of the relay node, the configuration information of the data, which is required to be transmitted by the distributed unit portion of the relay node, needs to be updated. According to the above process, signaling required for updating the configuration information can be effectively reduced. For example, the mapping-related information interacted in the above process may assist the receiving node in updating multiple configurations simultaneously (for example, updating the configurations of data transmission for different users simultaneously, or updating the configurations of signaling transmission simultaneously, or updating the configurations of data transmission and signaling transmission for different users simultaneously), thereby signaling overhead is saved;
3. The connection between the distributed unit portion of the relay node and the central unit of the source anchor node (donor node) is maintained, the configuration update for users accessing the relay node is reduced, and thereby signaling overhead is saved.

Based on the inventive content of the second aspect, the beneficial effects include at least:

When the configuration information of the data, which is required to be transmitted by the distributed unit of the relay node, needs to be updated, signaling required for updating the configuration information can be effectively reduced according to the above process. For example, the mapping-related information interacted in the above process may assist the receiving node in updating multiple configurations simultaneously (e.g., updating the configurations of data transmission for different users simultaneously, or updating the configurations of signaling transmission simultaneously, or updating the configurations of data transmission and signaling transmission for different users simultaneously), thereby signaling overhead is saved.

Based on the inventive content of the third aspect, the beneficial effects include at least:
1. By interacting the configuration information related to the data served by the relay node, it can help the anchor node (donor node) (the above sixth node) to configure the backhaul link channel and transmission path required for serving the data of the relay node, thereby facilitating the transmission of the data of the relay node through the network controlled by other anchor nodes (donor nodes), and reducing the load of the network served by the anchor node (donor node) connected by the relay node;
2. By interacting the configuration information related to the data served by the relay node, it can help the anchor node (donor node) to which the relay node is connected to configure the transmission of data, such as to determine the information required to be included in the downlink data packet (such as a configuration value of a DSCP field, a configuration value of a flow label field), to configure the information required to be included in the uplink data packet (such as routing identification information), to configure the transmission of the uplink data packet, such as to determine a next hop node and to determine a backhaul link channel to be adopted;
3. The data of the first node can be transmitted to the fifth node through the central unit of the sixth node, and the data of the fifth node can be transmitted to the first node through the central unit of the sixth node; Alternatively, the data of the first node can be transmitted to the fifth node through the distributed unit of the sixth node, and the data of the fifth node can be transmitted to the first node through the distributed unit of the sixth node, so that migration of the distributed unit portion of the relay node can be avoided, signaling overhead in the migration process of the relay node can be reduced, and migration of the relay node can be accelerated.

FIG. 11 is a block diagram of an anchor node (donor node) according to an embodiment of the present disclosure.

Referring to FIG. 11, an anchor node (donor node) 1100 includes a transceiver 1110, a controller 1120, and a memory 1130. Under the control of the controller 1120 (which may be implemented as a processor), the anchor node (donor node) 1100 (including the transceiver 1110 and the memory 1130) is configured to perform the operations in the processes shown in FIGS. 4 to 10 or the operations of the anchor node (donor node) described above, including but not limited to the operations of the source anchor node (donor node) and the target anchor node (donor node). Although the transceiver 1110, the controller 1120, and the memory 1130 are shown as separate entities, they may be implemented as a single entity, such as a single chip. The transceiver 1110, the controller 1120, and the memory 1130 may be electrically connected or coupled to each other. The transceiver 1110 may transmit signals to and receive signals from other network entities, such as another anchor node (donor node), relay node, and/or UE, etc. The controller 1120 may be configured to execute instructions stored in the memory 1130 to control the overall operation of the anchor node (donor node) 1100, thereby realizing the operations in the processes shown in FIGS. 4 to 10 or operations of the anchor node (donor node) described above.

FIG. 12 is a block diagram of a relay node according to an embodiment of the present disclosure.

Referring to FIG. 12, relay node 1200 includes a transceiver 1210, a controller 1220, and a memory 1230. Under the control of the controller 1220 (which may be implemented as a processor), the relay node 1200 (including the transceiver 1210 and the memory 1230) is configured to perform the operations in the processes shown in FIGS. 4 to 10 or the operations of the relay node described above. Although transceiver 1210, controller 1220, and memory 1230 are shown as separate entities, they may be implemented as a single entity, such as a single chip. The transceiver 1210, the controller 1220, and the memory 1230 may be electrically connected or coupled to each other. The transceiver 1210 may transmit and receive signals to and from other network entities, such as an anchor node (donor node), another relay node, and/or UE, etc. The controller 1220 may be configured to perform instructions stored in the memory 1230 to control the overall operations of the relay node 1200, thereby performing the operations in the processes shown in FIGS. 4 to 10 or the operations of the relay node described above.

Those skilled in the art can realize that the present disclosure can be implemented in other specific forms without changing the technical idea or basic features of the present disclosure. Therefore, it should be understood that the above-mentioned embodiments are merely examples and are not limited thereto. The scope of the present disclosure is defined by the appended claims rather than by the detailed description. Therefore, it should be understood that all modifications or variations derived from the meaning and scope of the appended claims and their equivalents are within the scope of the present disclosure.

In the above embodiments of the present disclosure, all operations and messages may be selectively performed or may be omitted. In addition, the operations in each embodiment need not be performed sequentially, and the order of operations may be changed. Messages do not need to be delivered sequentially, and the delivery order of messages may change. Each operation and each message transfer can be performed independently.

Although the present disclosure has been shown and described with reference to various embodiments thereof, those skilled in the art will understand that various changes in form and details may be made without departing from the spirit and scope of the disclosure as defined by the appended claims and their equivalents.

The invention claimed is:

1. A method performed by a first donor node in a wireless communication system, comprising:
transmitting, to a second donor node, a first message for requesting configuration information for migration of traffic; and
receiving, from the second donor node, a second message for providing configuration information for the migration of the traffic in response to the first message,
wherein the second message includes configuration information related to a downlink data packet, and
wherein the configuration information related to the downlink data packet includes identification information about a prior-hop node including backhaul adaptation protocol (BAP) address information.

2. The method of claim 1,
wherein the first message further includes at least one of:
identification information on a user equipment (UE) of at least one user served by the first donor node,
information related to a radio bearer for the UE,
identification information on the radio bearer,
information on a quality of service (QoS) of the radio bearer,
or
information on routing identification.

3. The method of claim 1,
wherein the second message includes at least one of:
information related to a radio bearer for a user equipment (UE),
identification information on the radio bearer,
configuration information related to an uplink data packet.

4. The method of claim 3, wherein the configuration information related to downlink data packet includes at least one of:

information on configuration value of a flow label field of the downlink data packet,
BAP routing identification information,
or
identification information on ingress backhaul radio link control (RLC) channel.

5. The method of claim 3, wherein the configuration information related to uplink data packet includes at least one of:
BAP routing identification information,
identification information of a next-hop node including BAP address information, or
identification information on egress backhaul radio link control (RLC) channel.

6. The method of claim 1, further comprising:
transmitting, to a third node, a third message for a configuration of at least one transmission and receipt data at the third node,
wherein the third node is a distribution unit.

7. The method of claim 6,
wherein the third message includes at least one of:
identification information of a next-hop node including BAP address information,
ingress BAP routing identification information, or
egress BAP routing identification information.

8. A method performed by a second donor node in a wireless communication system, comprising:
receiving, from a first donor node, a first message for requesting configuration information for migration of traffic; and
transmitting, to the first donor node, a second message for providing configuration information for the migration of the traffic in response to the first message,
wherein the second message includes configuration information related to a downlink data packet, and
wherein the configuration information related to the downlink data packet includes identification information about a prior-hop node including backhaul adaptation protocol (BAP) address information.

9. The method of claim 8,
wherein the first message further includes at least one of:
identification information on a user equipment (UE) of at least one user served by the first donor node,
information related to a radio bearer for the UE,
identification information on the radio bearer,
information on a quality of service (QoS) of the radio bearer,
or
information on routing identification.

10. The method of claim 8,
wherein the second message includes at least one of:
information related to a radio bearer for a user equipment (UEL),
identification information on the radio bearer,
or
configuration information related to an uplink data packet.

11. A first donor node in a wireless communication system, comprising:
a transceiver; and
at least one processor coupled with the transceiver,
wherein the at least one processor is configured to:
transmit, to a second donor node, a first message requesting configuration information for migration of traffic; and
receive, from the second donor node, a second message for providing configuration information for the migration of the traffic in response to the first message, wherein the second message includes configuration information related to a downlink data packet, and
wherein the configuration information related to the downlink data packet includes identification information about a prior-hop node including backhaul adaptation protocol (BAP) address information.

12. The first donor node of claim 11,
wherein the first message further includes at least one of:
identification information on a user equipment (UE) of at least one user served by the first donor node,
information related to a radio bearer for the UE,
identification information on the radio bearer,
information on a quality of service (QoS) of the radio bearer,
or
information on routing identification.

13. The first donor node of claim 11, wherein the second message includes at least one of:
information related to a radio bearer for a user equipment (UE),
identification information on the radio bearer,
or
configuration information related to an uplink data packet.

14. The first donor node of claim 13, wherein the configuration information related to downlink data packet includes at least one of:
information on configuration value of a flow label field of the downlink data packet,
BAP routing identification information,
or
identification information on ingress backhaul radio link control (RLC) channel.

15. The first donor node of claim 13, wherein the configuration information related to uplink data packet includes at least one of:
BAP routing identification information,
identification information of a next-hop node including BAP address information, or
identification information on egress backhaul radio link control (RLC) channel.

16. The first donor node of claim 11, the at least one processor is further configured to:
transmit, to a third node, a third message for a configuration of at least one transmission and receipt data at the third node,
wherein the third node is a distribution unit.

17. The first donor node of claim 16, wherein the third message includes at least one of:
identification information of a next-hop node including BAP address information,
ingress BAP routing identification information, or
egress BAP routing identification information.

18. A second donor node in a wireless communication system, comprising:
transceiver; and
at least one processor coupled with the transceiver,
wherein the at least one processor is configured to:
receive, from a first donor node, a first message for requesting configuration information for migration of traffic; and
transmit, to the first donor node, a second message for providing configuration information for the migration of the traffic in response to the first message,
wherein the second message includes configuration information related to a downlink data packet, and
wherein the configuration information related to the downlink data packet includes identification information about a prior-hop node including backhaul adaptation protocol (BAP) address information.

19. The second donor node of claim 18,
wherein the first message includes at least one of:
identification information on a user equipment (UE) of at least one user served by the first donor node,
information related to a radio bearer for the UE,
identification information on the radio bearer,
information on a quality of service (QoS) of the radio bearer,
or
information on routing identification.

20. The second donor node of claim 18, wherein the second message includes at least one of:
information related to a radio bearer for a user equipment (UE),
identification information on the radio bearer,
or
configuration information related to an uplink data packet.

* * * * *